United States Patent
Kwon et al.

(10) Patent No.: US 10,263,453 B2
(45) Date of Patent: *Apr. 16, 2019

(54) WIRELESS POWER TRANSMITTERS AND RECEIVERS, AND METHOD FOR PERMITTING A WIRELESS POWER RECEIVER BY A WIRELESS POWER TRANSMITTER

(71) Applicant: Samsung Electronics Co., Ltd., Gyeonggi-do (KR)

(72) Inventors: Hyuk-Choon Kwon, Seoul (KR); Ho-Dong Kim, Seoul (KR); Kyung-Woo Lee, Seoul (KR); Kang-Ho Byun, Gyeonggi-do (KR); Hee-Won Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,095

(22) Filed: Aug. 21, 2017

(65) Prior Publication Data

US 2017/0373523 A1 Dec. 28, 2017

Related U.S. Application Data

(63) Continuation of application No. 14/058,884, filed on Oct. 21, 2013, now Pat. No. 9,768,637.

(30) Foreign Application Priority Data

Oct. 19, 2012 (KR) .................. 10-2012-0116392
May 3, 2013 (KR) .................. 10-2013-0050308

(51) Int. Cl.
*H02J 7/02* (2016.01)
*H02J 50/10* (2016.01)
(Continued)

(52) U.S. Cl.
CPC .............. *H02J 7/025* (2013.01); *H02J 5/005* (2013.01); *H02J 50/10* (2016.02); *H02J 50/80* (2016.02);
(Continued)

(58) Field of Classification Search
CPC ........................................ H02J 7/025
(Continued)

(56) References Cited

U.S. PATENT DOCUMENTS

2008/0122297 A1 5/2008 Arai
2008/0197802 A1 8/2008 Onishi et al.
(Continued)

FOREIGN PATENT DOCUMENTS

CN 101937593 1/2011
CN 101937596 1/2011
(Continued)

OTHER PUBLICATIONS

European Search Report dated May 4, 2016 issued in counterpart application No. 13847694.0-1804, 6 pages.
(Continued)

*Primary Examiner* — Edward Tso
*Assistant Examiner* — Ahmed Omar
(74) *Attorney, Agent, or Firm* — The Farrell Law Firm, P.C.

(57) ABSTRACT

An apparatus and method are provided for permitting a wireless power receiver to be charged by a wireless power transmitter. The method includes generating a Power Receiving Unit (PRU) control signal including permission information indicating charging permission for the wireless power receiver; and transmitting the PRU control signal to the wireless power receiver.

21 Claims, 15 Drawing Sheets

(51) Int. Cl.
  *H02J 50/80* (2016.01)
  *H02J 5/00* (2016.01)
  *H02J 7/00* (2006.01)
  *H02J 50/40* (2016.01)
  *H02J 50/60* (2016.01)

(52) U.S. Cl.
  CPC ............. *H02J 7/0011* (2013.01); *H02J 50/40* (2016.02); *H02J 50/60* (2016.02); *H02J 2007/0001* (2013.01); *H02J 2007/0096* (2013.01)

(58) Field of Classification Search
  USPC ........................................................ 320/108
  See application file for complete search history.

(56) References Cited

U.S. PATENT DOCUMENTS

| 2009/0085522 | A1 | 4/2009 | Matsumoto |
| 2010/0225272 | A1 | 9/2010 | Kirby et al. |
| 2011/0025265 | A1 | 2/2011 | Mochida |
| 2012/0149307 | A1 | 6/2012 | Torada et al. |
| 2012/0214418 | A1 | 8/2012 | Lee |
| 2012/0231856 | A1 | 9/2012 | Lee et al. |
| 2012/0268238 | A1 | 10/2012 | Park |
| 2013/0015705 | A1 | 1/2013 | Abe |

FOREIGN PATENT DOCUMENTS

| CN | 102651785 | 8/2012 |
| JP | 2008-154446 | 7/2008 |
| JP | 2011-211874 | 10/2011 |
| KR | 1020100134843 | 12/2010 |
| KR | 1020110122728 | 11/2011 |
| KR | 1020120102446 | 9/2012 |

OTHER PUBLICATIONS

Chinese Office Action dated Dec. 26, 2016 issued in counterpart application No. 201380054306.9, 13 pages.

Korean Office Action dated Apr. 6, 2017 issued in counterpart application No. 10-2013-0050308, 12 pages.

WIRELESS POWER TRANSMITTERS AND RECEIVERS, AND METHOD FOR PERMITTING A WIRELESS POWER RECEIVER BY A WIRELESS POWER TRANSMITTER

PRIORITY

This application is a Continuation of U.S. patent application Ser. No. 14/058,884 filed with the U.S. Patent and Trademark Office on Oct. 21, 2013, and claims priority under 35 U.S.C. § 119(a) to Korean Patent Application Serial Nos. 10-2012-0116392 and 10-2013-0050308, which were filed in the Korean Intellectual Property Office on Oct. 19, 2012 and May 3, 2013, respectively, the entire disclosure of each of which is hereby incorporated by reference.

BACKGROUND OF THE INVENTION

1. Field of the Invention

The present invention relates generally to a wireless charging network, and more particularly, to wireless power transmitter and receivers, and a method for permitting, by a wireless power transmitter, a wireless power receiver for charging in a wireless charging network.

2. Description of the Related Art

Mobile terminals, such as cell phones, Personal Digital Assistants (PDAs), etc., are powered by rechargeable batteries, and often use separate charging devices to recharge these batteries.

Typically, a charging device and a battery, each having contacting terminals on an outer surface thereof, are electrically connected by connecting their contacting terminals to each other. However, when using a contact charging method, the contacting terminals are often contaminated with dirt or rust, leading to inappropriate battery charging.

To address this problem, wireless charging or contactless charging technologies have been developed and applied to many different electronic devices. For example, using wireless charging, a battery of a cell phone is automatically charged by placing the cell phone on a charging pad, without using a separate charging connector.

Examples of wireless charging technology include an electromagnetic induction method using coils, a resonance method using resonance, and a Radio Frequency (RF)/microwave radiation method that converts electrical energy into microwaves for transmission.

The method based on electromagnetic induction transfers power between primary and secondary coils. More specifically, moving a magnet around a coil produces an induced current, based on which a magnetic field is produced at a transmission end. The change in the magnetic field at a receiving end induces a current to generate energy. This phenomenon is commonly referred to as "magnetic induction," and the wireless power transmission method based on the magnetic induction provides superior energy transmission efficiency.

In the resonance method using resonance, resonant electrical energy of electromagnetic waves is directly transferred only to a device having a same resonant frequency, and a non-used part of the energy is re-absorbed into the magnetic field, rather than being dispersed in the air. Consequently, the resonant electrical energy is not deemed harmful to surrounding machines or bodies.

Although studies on the various wireless charging methods have recently been done, standards for prioritizing wireless charging, searching for wireless power transmitters/receivers, selecting the communication frequency between the wireless power transmitter and receiver, adjusting the wireless power, selecting a matching circuit, distributing communication time for each wireless power receiver in a single charging cycle, etc., have not yet been suggested.

SUMMARY OF THE INVENTION

Accordingly, the present invention is designed to address at least the problems and/or disadvantages described above and to provide at least the advantages described below.

An aspect of the present invention provides wireless power transmitters and receivers, and a method for a wireless power transmitter to permit charging of a wireless power receiver.

Another aspect of the present invention provides a method for a wireless power transmitter to notify at least one wireless power receiver in a charging network whether it is permitted to be wirelessly charged.

In accordance with an aspect of the present invention, a method is provided for permitting a wireless power receiver to be charged by a wireless power transmitter. If the wireless power transmitter has limited available power, a first Power Receiving Unit (PRU) control signal is generated including a permission field indicating that charging the wireless power receiver is permitted with a waiting time and transmitting the first PRU control signal to the wireless power receiver. If the wireless power transmitter has available power, a second PRU control signal is generated including a permission field indicating that the wireless power receiver is permitted to begin charging and transmitting the second PRU control signal to the wireless power receiver.

In accordance with another aspect of the present invention, a control method of a wireless power receiver is provided that includes receiving, from a wireless power transmitter, a first Power Receiving Unit (PRU) control signal including a permission field indicating that charging the wireless power receiver is permitted with a waiting time if the wireless power transmitter has limited available power; determining whether the wireless power receiver is on standby; generating a PRU reporting signal including standby information indicating whether or not the wireless power receiver is determined to be on standby for charging; transmitting the PRU reporting signal to the wireless power transmitter; and receiving a second PRU control signal including a permission field indicating that the wireless power receiver is permitted to begin charging if wireless power transmitter has available power.

In accordance with another aspect of the present invention, a wireless power transmitter is provided for wirelessly charging a wireless power receiver, with the wireless power transmitter including a power transmitter configured to wirelessly transmit charging power to the wireless power receiver; a communication unit; and a controller configured to generate a first Power Receiving Unit (PRU) control signal including a permission field indicating that charging the wireless power receiver is permitted with a waiting time if the wireless power transmitter has limited available power; control the communication unit to transmit the first PRU control signal to the wireless power receiver; generate a second PRU control signal including a permission field indicating that the wireless power receiver is permitted to begin charging, if the wireless power transmitter has available power; and control the communication unit to transmit the second PRU control signal to the wireless power receiver.

In accordance with another aspect of the present invention, a wireless power receiver is provided for receiving charging power from a wireless power transmitter, with the wireless power receiver including a power receiver configured to receive charging power from the wireless power transmitter; a communication unit configured to receive, from the wireless power transmitter, a first Power Receiving Unit (PRU) control signal including a permission field indicating that charging the wireless power receiver is permitted with a waiting time when the wireless power transmitter has limited available power; a display unit configured to display a message asking a user whether to be on standby; and a controller configured to generate a PRU reporting signal including standby information indicating whether the wireless power receiver is on standby for charging and to control the communication unit to transmit the PRU reporting signal to the wireless power transmitter, wherein the communication unit receives a second PRU control signal including a permission field indicating that the wireless power receiver is permitted to begin charging if the wireless power transmitter has available power.

BRIEF DESCRIPTION OF THE DRAWINGS

The above and other aspects, features, and advantages of certain embodiments of the present invention will become more apparent from the following detailed description taken in conjunction with reference to the accompanying drawings, in which.

Throughout the drawings, like reference numerals will be understood to refer to like parts, components, and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
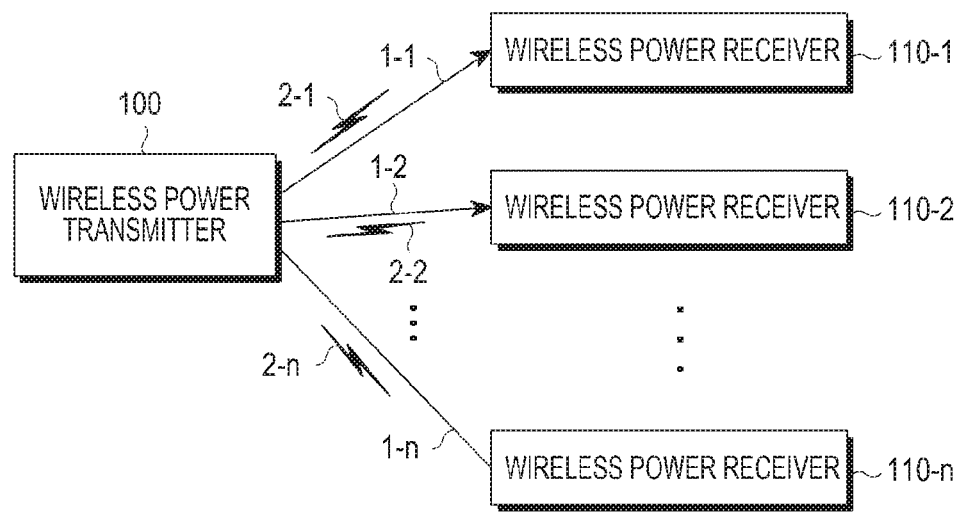
FIG. 1 illustrates a wireless charging system, according to an embodiment of the present invention.

FIG. 1 illustrates a wireless charging system, according to an embodiment of the present invention.

Referring to FIG. 1, the wireless charging system includes a wireless power transmitter 100 and wireless power receivers 110-1, 110-2, . . . 110-n. The wireless power receivers 110-1, 110-2, . . . 110-n may be included in mobile communication terminals, PDAs, Portable Multimedia Players (PMPs), smartphones, etc. The wireless power transmitter 100 wirelessly transmits power 1-1, 1-2, . . . 1-n to the wireless power receivers 110-1, 110-2, . . . 110-n, which are wireless power receivers authenticated for charging via a predetermined authentication procedure. For example, the wireless power transmitter 100 transmits the wireless power to the wireless power receivers 110-1, 110-2, . . . 110-n in an electromagnetic waveform.

The wireless power transmitter 100 may also perform bidirectional communication with the wireless power receivers 110-1, 110-2, . . . 110-n. The wireless power transmitter 100 and the wireless power receiver 110-1, 110-2, . . . 110-n process and transmit/receive packets 201, 202, . . . 2-n including certain frames, which will be described below in more detail.

When the wireless power transmitter 100 uses the above-described resonance method to wirelessly transmit power to the wireless power receivers 110-1, 110-2, . . . 110-n, a distance between the wireless power transmitter 100 and the wireless power receivers 110-1, 110-2, . . . 110-n may be 30 m or less. However, when the wireless power transmitter 100 uses the above-described electromagnetic induction method to wirelessly transmit power to the wireless power receivers 110-1, 110-2, . . . 110-n, a distance between the wireless power transmitter 100 and the wireless power receivers 110-1, 110-2, . . . 110-n may be 10 cm or less.

The wireless power receivers 110-1, 110-2, . . . 110-n each charge a battery therein using the wireless power received from the wireless power transmitter 100. The wireless power receivers 110-1, 110-2, . . . 110-n may also transmit to the wireless power transmitter 100 a signal to request the wireless power transmission, information for the wireless power reception, information of a state of the wireless power receiver, and/or control information of the wireless power transmitter, which will be described below in more detail.

The wireless power receivers 110-1, 110-2, ... 110-n may also transmit a message indicating a respective charging state to the wireless power transmitter 100.

The wireless power transmitter 100 may include a display which displays the respective states of the wireless power receivers 110-1, 110-2, ... 110-n, based on messages received from the wireless power receivers 110-1, 110-2, ... 110-n. The wireless power transmitter 100 may also display an estimate of the time until the charging the respective wireless power receivers 110-1, 110-2, ... 110-n is complete.

The wireless power transmitter 100 may also transmit a control signal to each of the wireless power receivers 110-1, 110-2, ... 110-n to disable the wireless charging function. When receiving the disable signal from the wireless power transmitter 100, each of the wireless power receivers 110-1, 110-2, ... 110-n disables its own wireless charging function.

Figure 2:
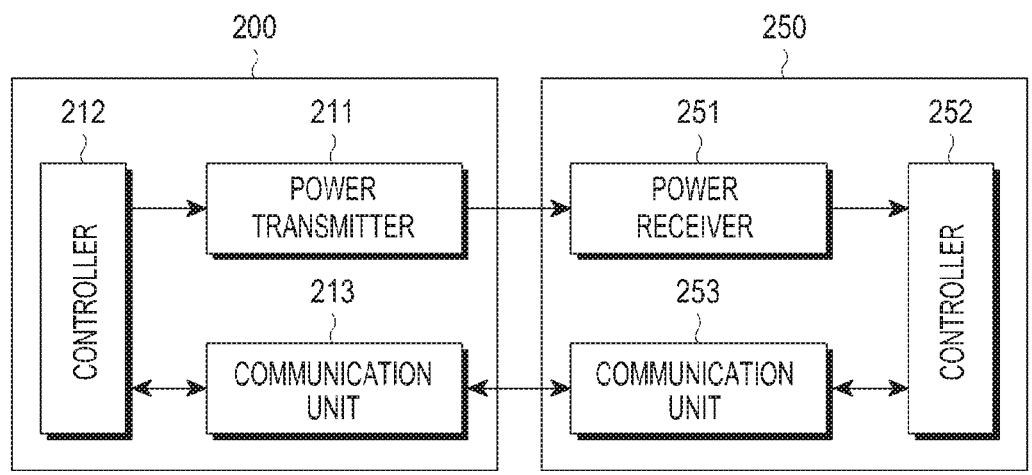
FIG. 2 is a block diagram illustrating a wireless power transmitter and a wireless power receiver, according to an embodiment of the present invention.

FIG. 2 is a block diagram illustrating a wireless power transmitter and a wireless power receiver, according to an embodiment of the present invention.

Referring to FIG. 2, the wireless power transmitter 200 includes a power transmitter 211, a controller 212, and a communication unit 213. The wireless power receiver 250 includes a power receiver 251, a controller 252, and a communication unit 253.

The power transmitter 211 wirelessly transmits power to the wireless power receiver 250. Herein, the power transmitter 211 may supply power in an Alternate Current (AC) waveform, or may convert power in a Direct Current (DC) form into an AC waveform for supply by using an inverter. The power transmitter 211 may include a built-in battery or a power receiving interface for receiving power from an outside, e.g., an outlet, and supplying power to other components in the wireless power transmitter 200. A person of ordinary skill in the art will readily understand that the power transmitter 211 is not limited thereto, but may be implemented by any device capable of wirelessly providing power in an AC waveform.

In addition, the power transmitter 211 may provide the AC power in electromagnetic waves to the wireless power receiver 250. The power transmitter 211 may further include a resonance circuit for transmitting or receiving certain electromagnetic waves.

When the power transmitter 211 includes the resonance circuit, an inductance L of a loop coil of the resonance circuit may vary. A person of ordinary skill in the art will readily understand that the wireless transmitter 211 is not limited thereto, but may be implemented by any device capable of transmitting or receiving electromagnetic waves.

The controller 212 controls general operations of the wireless power transmitter 200. To control general operations of the wireless power transmitter 200, the controller 212 may use a control algorithm, a program, or an application read from a storage (not shown). For example, the controller 212 may be implemented in the form of a central processing unit (CPU), a microprocessor, or a mini-computer.

The communication unit 213 communicates with the wireless power receiver 250 in a predetermined communication method. For example, the communication unit 213 may communicate with the communication unit 253 of the wireless power receiver 250 using Near Field Communication (NFC), Zigbee communication, infrared communication, ultraviolet communication, BlueTooth (BT) communication, Bluetooth Low Energy (BLE), etc. Additionally, the communication unit 213 may use the Carrier Sense Multiple Access/Collision Avoidance (CSMA/CA) algorithm.

Additionally, the communication unit 213 transmits an information signal of the wireless power transmitter 200, e.g., through unicasting, multicasting, or broadcasting.

The communication unit 213 receives power information from the wireless power receiver 250. For example, the power information may include at least one of a capacity of the wireless power receiver 250, remaining battery power, frequency of charging, battery consumption, battery capacity, and battery charge/consumption ratio.

The communication unit 213 transmits a charging function control signal to control a charging function of the wireless power receiver 250. The charge function control signal enables or disables the charging function by controlling the power receiver 251 of the wireless power receiver 250. Alternatively, the power information may include information about e.g., insertion of a wired charging terminal, change from SA mode to NSA mode, release from an error condition, etc.

The communication unit 213 may receive signals from the wireless power receiver 250 and also from different wireless power transmitters. For example, the communication unit 213 may receive a Notice signal having a frame as shown in Table 1, from the different wireless power transmitter.

Alternatively, the power transmitter 211 and the communication unit 213 may be integrated in a single hardware device, and thus, the wireless power transmitter 200 may use in-band communications.

As described above, the wireless power transmitter 200 and the wireless power receiver 250 communicate various signals with each other. Therefore, subscription of the wireless power receiver 250 to a wireless power network hosted by the wireless power transmitter 200 and a charging process through the wireless power network may be performed.

Figure 3:
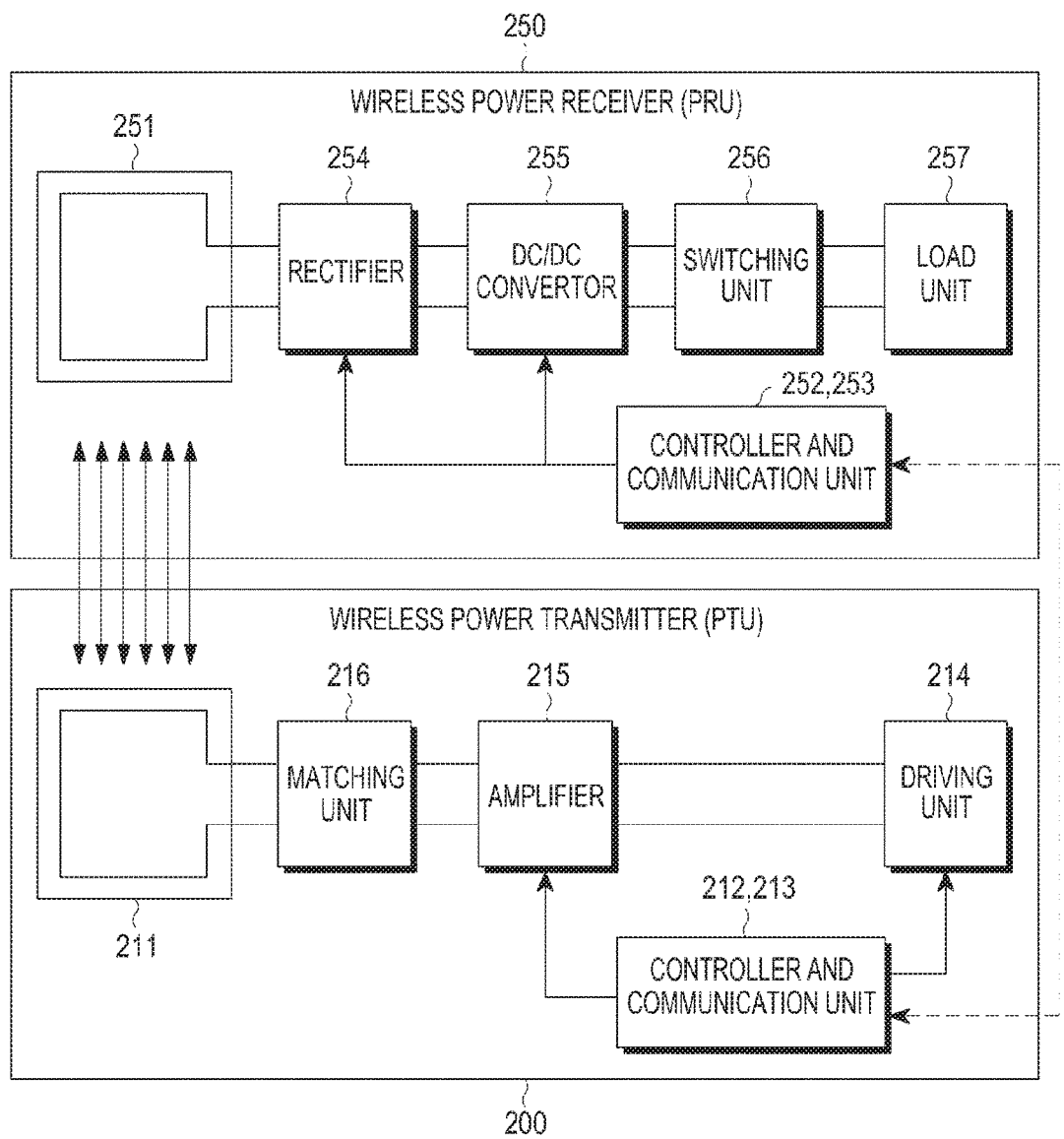
FIG. 3 is a block diagram illustrating a wireless power transmitter and a wireless power receiver, according to an embodiment of the present invention.

FIG. 3 is a block diagram illustrating a wireless power transmitter and a wireless power receiver, according to an embodiment of the present invention.

Referring to FIG. 3, the wireless power transmitter 200 includes a power transmitter 211, a controller and communication unit 212, 213, a driving unit 214, an amplifier, and a matching unit 216. The wireless power receiver 250 includes a power receiver 251, a controller and communication unit 252, 253, a rectifier 254, a DC-to-DC converter 255, a switching unit 256, and a loading unit 257.

The driving unit 214 outputs DC power with a preset voltage. The voltage value of the DC power output from the driving unit 214 may be controlled by the controller and communication unit 212, 213.

The DC current output by the driving unit 214 flows to the amplifier 215, which amplifies the DC current with a preset gain. The amplifier 215 may also convert the DC power to AC power based on a signal input from the controller and communication unit 212, 213. Accordingly, the amplifier 215 outputs the AC power.

The matching unit 216 performs impedance matching. For example, the matching unit 216 controls output power to be highly efficient or output by adjusting impedance viewed from the matching unit 216. The matching unit 216 adjusts impedance under control of the controller and communication unit 212, 213. For example, the matching unit 216 includes at least one of coils and capacitors. The controller and communication unit 212, 213 controls a state of connection with at least one of the coil and capacitor, and do impedance matching accordingly.

The power transmitter 211 transmits the AC power to the power receiver 251. In FIG. 3, the power transmitter 211 and the power receiver 251 are implemented as resonant circuits having a same resonant frequency. For example, the resonant frequency may be 6.78 MHz.

The controller and communication unit 212, 213 communicate with the controller and communication unit 252, 253 of the wireless power receiver 250, e.g., using bidirectional Wireless Fidelity (WiFi), Zigbee, or BT/BLE at 2.4 GHz.

The power receiver 251 receives the wireless charging power.

The rectifier 254, which may be implemented, for example, with bridge diodes, rectifies the received wireless power into a DC form. The DC-to-DC converter 255 converts the rectified power to have a predetermined gain. For example, the DC-to-DC converter 255 converts the rectified power to 5 V. Minimum and maximum values of a voltage that may be applied to the input end of the DC-to-DC converter 255 may be pre-determined.

The switching unit 256 connects the DC-to-DC converter 255 to the loading unit 257 and keeps an ON or OFF state under control of the controller 252. The loading unit 257 may store the converted power input from the DC-to-DC converter 255 when the switching unit 256 is in the ON state.

Figure 4:
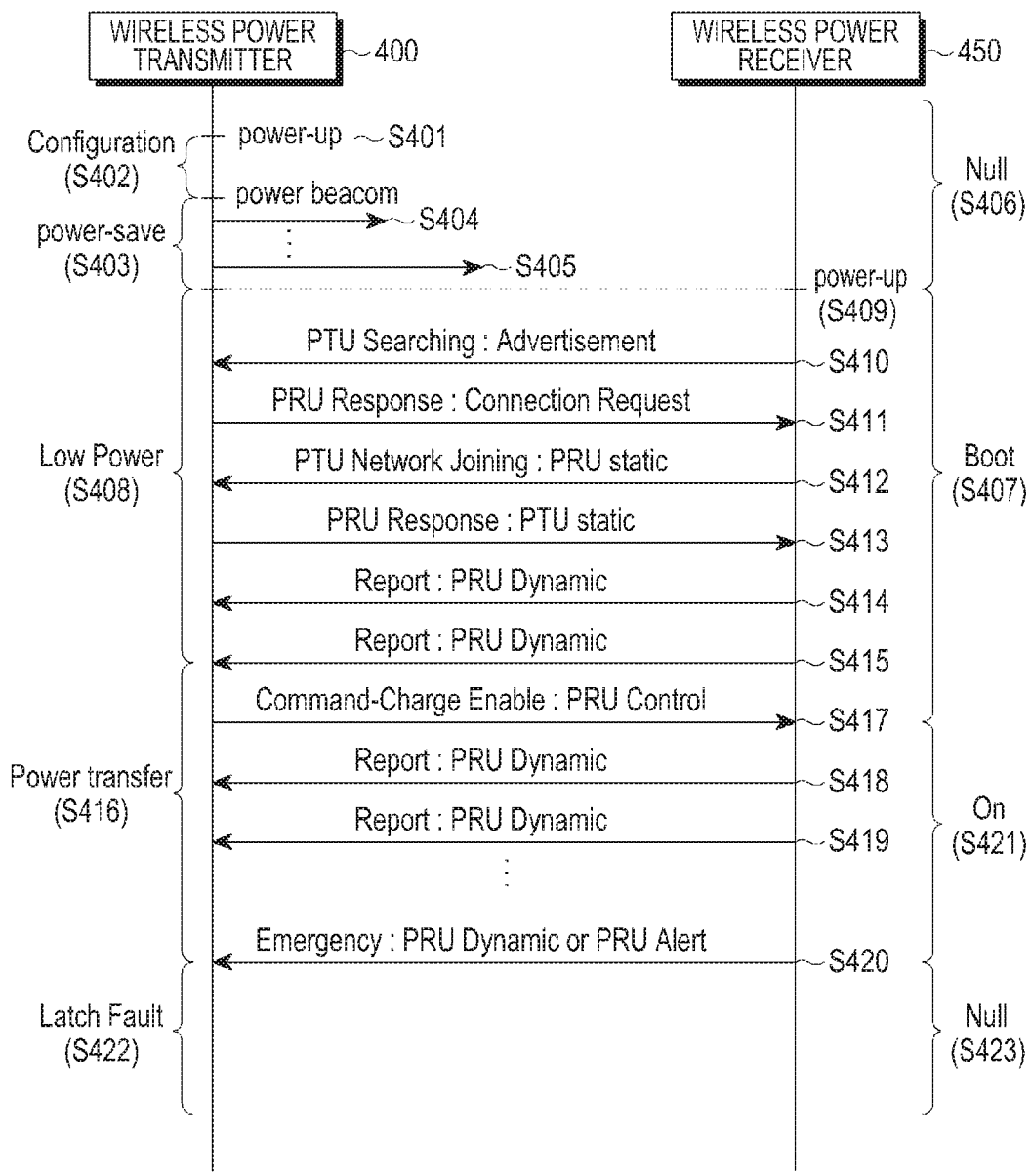
FIG. 4 is a signal flow diagram illustrating operations of a wireless power transmitter and a wireless power receiver, according to an embodiment of the present invention.

FIG. 4 is a signal flow diagram illustrating operations of a wireless power transmitter and a wireless power receiver, according to an embodiment of the present invention.

Referring to FIG. 4, a wireless power transmitter 400 powers up in step S401, and sets configurations in step S402.

In step S403, the wireless power transmitter 400 enters a power save mode, in which the wireless power transmitter 400 may apply different power beacons for detection for their respective periods. The wireless power transmitter 400 applies power beacons for detection at power values that may or may not be different, in steps 404 and 405. Some or all of the power beacons for detection may have sufficient amounts of power to drive a communication unit of a wireless power receiver 450. For example, the wireless power receiver 450 may communicate with the wireless power transmitter 400 by driving the communication unit with some or all of the power beacons. Herein, this state may be denoted as a null state.

The wireless power transmitter 400 may detect a load change due to the entrance of the wireless power receiver 450 into the wireless power network of the wireless power transmitter 400.

In step S408, the wireless power transmitter 400 enters a low power mode.

In step S409, the wireless power receiver 450 powers up with power received from the wireless power transmitter 400 and then drives its communication. In step S410, the wireless power receiver 450 transmits a Power Transmitting Unit (PTU) search signal, which is a signal to search for a wireless power transmitter. For example, the wireless power receiver 450 may transmit the PTU search signal in a BLE based Advertisement signal. Additionally, the wireless power receiver 450 may periodically transmit the PTU search signal, until a response from the wireless power transmitter 400 is received or expiration of a predetermined time.

Having received the PTU searching signal from the wireless power receiver 450, the wireless power transmitter 400 transmits a Power Receiving Unit (PRU) response signal in step S411. The PRU response signal forms a connection between the wireless power transmitter 400 and the wireless power receiver 450.

In step S412, the wireless power receiver 450 transmits a PRU static signal to the wireless power transmitter 400. The PRU static signal indicates a state of the wireless power receiver 450.

In step S413, the wireless power transmitter 400 transmits a PTU static signal to the wireless power receiver. The PTU static signal indicates a capability of the wireless power transmitter 400.

In steps S414 and S415, the wireless power receiver 450 periodically transmits a PRU dynamic signal. The PRU dynamic signal includes information about at least one parameter measured in the wireless power receiver 450. For example, the PRU dynamic signal may include information about a voltage at an output end of a rectifier of the wireless power receiver 450. Herein, this state of the wireless power receiver 450 may be denoted as a boot state S407.

In step S416, the wireless power transmitter 400 enters a power transfer mode, and in step S417, transmits a PRU control signal, i.e., a command signal authorizing the wireless power receiver 450 to be charged. In the power transfer mode, the wireless power transmitter 400 may transmit charging power.

The PRU control signal transmitted by the wireless power transmitter 400 may include enable/disable information and authorization (or permission) information authorizing the wireless power receiver 450 to be charged. The PRU control signal may be transmitted when the wireless power transmitter 400 is to change the state of the wireless power receiver 450, or may be periodically transmitted, e.g., at 250 ms intervals.

In steps S418 and S419, the wireless power receiver 450 changes its settings based on the PRU control signal and transmits the PRU dynamic signal to report the state of the wireless power receiver 450. For example, the PRU dynamic signal may include at least one of voltage, current, a state of the wireless power receiver, and temperature information. When transmitting the PRU dynamic signal, this state of wireless power receiver 450 may be denoted as an ON state.

For example, the PRU dynamic signal may have a data structure as shown in Table 1.

TABLE 1

| Field | octets | description | use | units |
| --- | --- | --- | --- | --- |
| Optional fields | 1 | 1 populated | mandatory | |
| $V_{rect}$ | 2 | Voltage at diode output | mandatory | mV |
| $I_{rect}$ | 2 | Current at diode output | Mandatory | mA |
| $V_{out}$ | 2 | Voltage at charge/battery port | Optional | mV |
| $I_{out}$ | 2 | Current at charge/battery port | Optional | mA |
| Temperature | 1 | Temperature of PRU | Optional | Deg C. from −40 C. |
| $V_{rect}$ min dyn | 2 | $V_{rect}$ low limit (dynamic value) | optional | mV |
| $V_{rect}$ set dyn | 2 | Desired $V_{rect}$ (dynamic value) | optional | mV |
| $V_{rect}$ hign dyn | 2 | $V_{rect}$ high limit (dynamic value) | optional | mV |
| PRU alert | 1 | Warnings | mandatory | Bit field |
| RFU | 3 | undefined | | |

As shown in Table 1, the PRU dynamic signal may include information about an optional field, voltage at the output of the rectifier of the wireless power receiver, current at the output of the rectifier of the wireless power receiver, voltage at the output of the DC-to-DC converter of the wireless power receiver, current at the output of the DC-to- DC converter of the wireless power receiver, temperature, minimum voltage at the output of the rectifier of the wireless power receiver, optimum voltage at the output of the rectifier of the wireless power receiver, maximum voltage at the output of the rectifier of the wireless power receiver, and a PRU alert.

For example, the PRU alert information may be formed in a data structure as shown in Table 2.

TABLE 2

| 7 | 6 | 5 | 4 | 3 | 2 | 1 | 0 |
|---|---|---|---|---|---|---|---|
| over voltage | over current | over temperature | charge complete | TA detect | transition | restart request | RFU |

As shown in Table 2, the PRU alert information may include an over voltage field, an over current field, an over temperature field, a charge complete field, a wired charging terminal insertion detect (TA detect) field, an SA/NSA mode transition field, a restart request field, and a Reserved for Future Use (RFU) field.

The wireless power receiver 450 receives the PRU control signal and then starts charging. For example, if the wireless power transmitter 400 has enough power to charge the wireless power receiver 450, it transmits the PRU control signal to enable the wireless power receiver to be charged. The PRU control signal may be transmitted each time a charging state changes. Alternatively, the PRU control signal may be transmitted at intervals of 250 ms, or may be transmitted each time there is a change in parameter. The PRU control signal may also be transmitted in a predetermined threshold time, e.g., every second, even if there is no change in parameter.

Upon detection of an error, the wireless power receiver 450 sends an alert signal to the wireless power transmitter in step S420. The alert signal may be transmitted in the PRU dynamic signal or in the PRU alert signal. For example, the wireless power receiver 450 may send the wireless power transmitter 400 the alert signal by reflecting an error condition in the PRU alert field of Table 3, as shown below.

Alternatively, the wireless power receiver 450 may send the wireless power transmitter 400 the alert signal (e.g., the PRU alert signal) to indicate an error condition. Upon reception of the alert signal, the wireless power transmitter 400 enters a latch fault mode in step S422 and the wireless power receiver 450 enters into a null state in step S423.

Figure 5:
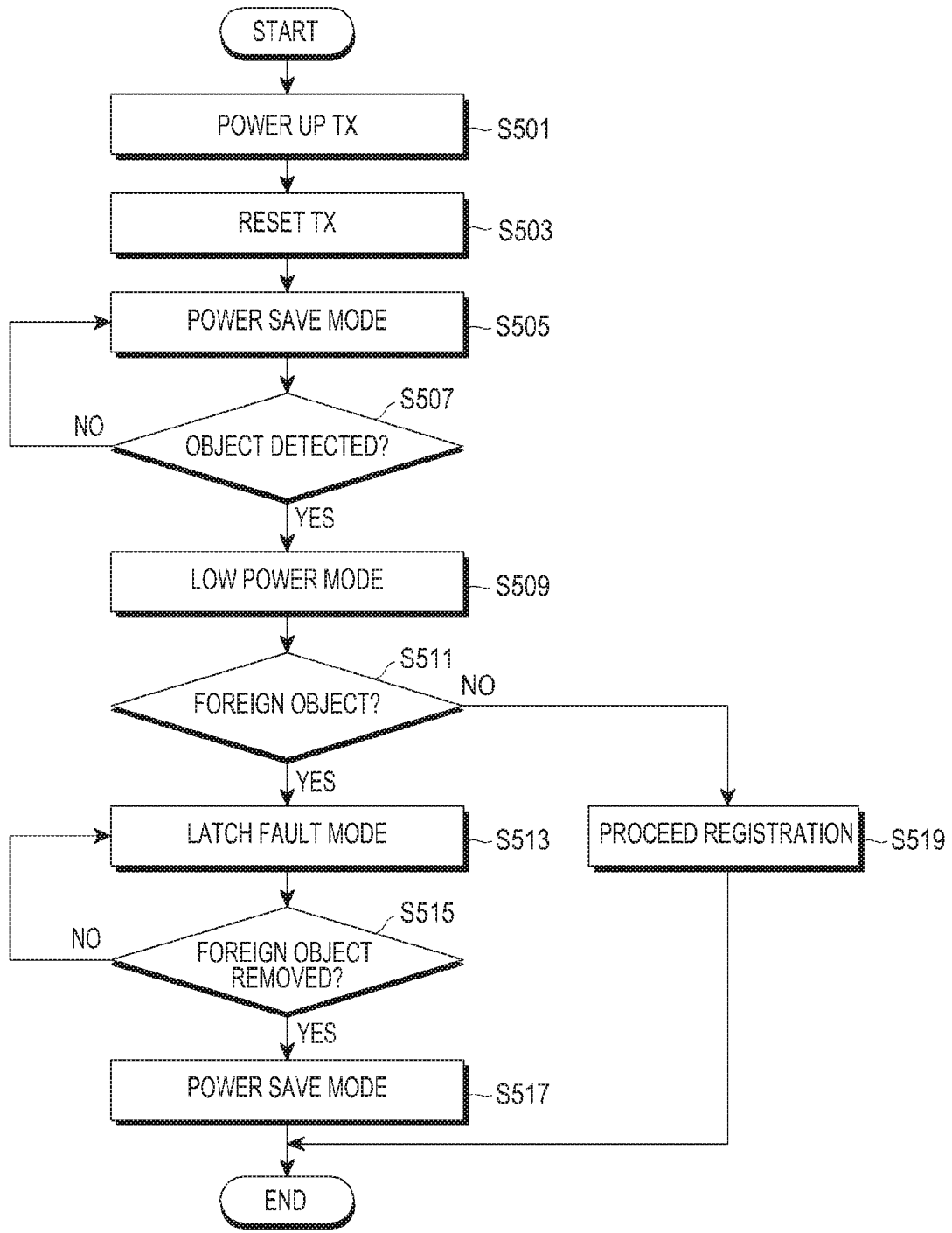
FIG. 5 is a flowchart illustrating operations of a wireless power transmitter and wireless power receiver, according to an embodiment of the present invention.

FIG. 5 is a flowchart illustrating operations of a wireless power transmitter and a wireless power receiver, according to an embodiment of the present invention.

Referring to FIG. 5, the wireless power transmitter powers up in step S501. In step S503, the wireless power transmitter resets its initial configuration. In step S505, the wireless power transmitter enters into a power save mode. In the power save mode, the wireless power transmitter may apply different amounts of power to its power transmitter.

Figure 6:
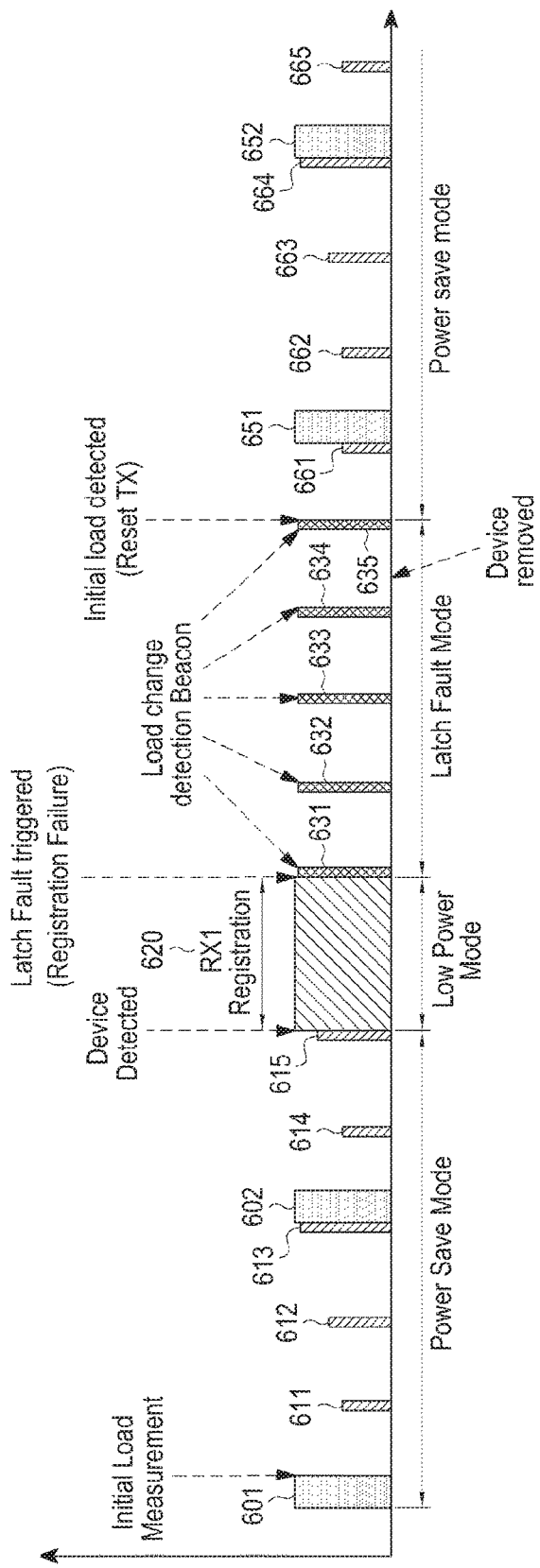
FIG. 6 illustrates histograms of amounts of power applied by a wireless power transmitter over time.

FIG. 6 illustrates histograms of amounts of power applied by a wireless power transmitter over time, according to an embodiment of the present invention.

For example, as illustrated in FIG. 6, the wireless power transmitter applies second detection powers 601 and 602 and third detection powers 611 to 615 to the power transmitter. More specifically, the wireless power transmitter applies the second detection powers 601 and 602 at second cycles in a second period of time and applies the third detection powers 611 to 615 at third cycles in a third period of time. Although FIG. 6 illustrates the third detection power 611 to 615 having different values, the third detection power 611 to 615 may also have the same values. For example, the wireless power transmitter may output the third detection power 611 and subsequently the third detection power 612 having the same amount of power as that of the third detection power 611.

When the wireless power transmitter outputs the same amount of third detection power, the amount of third detection power is set to detect a smallest wireless power receiver, e.g., a wireless power receiver of category 1.

However, the wireless power transmitter may output the third detection power 611 and subsequently the third detection power 612 having a different amount of power from that of the third detection power 611. When the wireless power transmitter outputs different amounts of third detection power, each amount of third detection power may be set to detect a wireless power receiver in any of categories 1 to 5.

For example, the third detection power 611 is set high enough to detect a wireless power receiver of category 5, the third detection power 612 is set high enough to detect a wireless power receiver of category 3, and the third detection power 613 is set high enough to detect a wireless power receiver of category 1.

The second detection powers 601 and 602 are set high enough to drive the wireless power receiver, i.e., to drive the controller and communication part of the wireless power receiver.

The wireless power transmitter applies the second detection powers 601 and 602 and the third detection powers 611 to 615 to the wireless power receiver at second and third cycles, respectively. If the wireless power receiver is arranged on the wireless power transmitter, impedance viewed from a particular point of the wireless power transmitter may be changed. The wireless power transmitter may detect the change in impedance while applying the second detection powers 601 and 602 and the third detection powers 611 to 615. For example, the wireless power transmitter may detect the change in impedance while applying the third detection power 615.

Accordingly, referring again to FIG. 5, the wireless power transmitter detects an object in step S507. If an object has not been detected in step S507, the wireless power transmitter maintains the power save mode, wherein different kinds of power are periodically applied, in step S505.

However, if an object has been detected, e.g., by a change in impedance, in step S507, the wireless power transmitter enters a low power mode in step S509. In the low power mode, the wireless power transmitter applies enough power to drive the controller and communication unit of the wireless power receiver.

For example, referring again to FIG. 6, the wireless power transmitter applies driving power 620 to the power transmitter. The wireless power receiver receives the driving power 620 and drives the controller and communication unit. Based on the driving power 620, the wireless power receiver communicates with the wireless power transmitter in a predetermined scheme. For example, the wireless power receiver transmits or receives data authentication, and joins a wireless power network hosted by the wireless power transmitter based on the data. If a foreign object is detected, instead of the wireless power receiver, data communication is not made.

Thus, referring again to FIG. 5, the wireless power transmitter determines whether a foreign object is detected in step S511. For example, if the wireless power transmitter has not received any response from an object within a predetermined time, the wireless power transmitter may determine that the detected object is a foreign object.

Having determined that the object is a foreign object, the wireless power transmitter enters a latch fault mode in step S513. However, when the object is not a foreign object the wireless power transmitter performs a joining procedure in step S519.

For example, the wireless power transmitter may periodically apply first powers 631 to 634 at first cycles. The wireless power transmitter may detect a change in impedance while applying the first power.

If the foreign object has been removed in step S515, the wireless power transmitter may detect the change in impedance and determine that the foreign object has been removed. However, if the foreign object has not been removed in step S515, the wireless power transmitter may not detect the change in impedance and determines that the foreign object has not been removed. When the foreign object has not been removed, the wireless power transmitter may output an indication, e.g., a lamp flickering and/or warning sound, to inform the user that the wireless power transmitter is currently in an error condition.

If it is determined that the foreign object has not been removed in step S515, the wireless power transmitter maintains the latch fault mode in step S513. However, if the foreign object is determined to have been removed in step S515, the wireless power transmitter enters the power save mode in step S517.

For example, as illustrated in FIG. 6, the wireless power transmitter may apply second powers 651 and 652 and third powers 661 to 665.

As described above, the wireless power transmitter enters the latch fault mode if a foreign object is detected, instead of a wireless power receiver. The wireless power transmitter then determines whether the foreign object has been removed, based on a change in impedance at the power applied in the latch fault mode. Basically, the latch fault mode is entered when a foreign object is placed within a detection range of the wireless power transmitter.

However, there may be other various requirements for entering the latch fault mode in accordance with other embodiments of the present invention. For example, the wireless power transmitter may enter the latch fault mode after cross-connecting to the wireless power receiver. A cross-connection occurs when the wireless power transmitter connects with a wireless power receiver that is already connected to another wireless power transmitter Thus, in cross-connecting between the wireless power transmitter and the wireless power receiver, the wireless power transmitter returns to an initial state and the wireless power receiver is removed.

Figure 7:
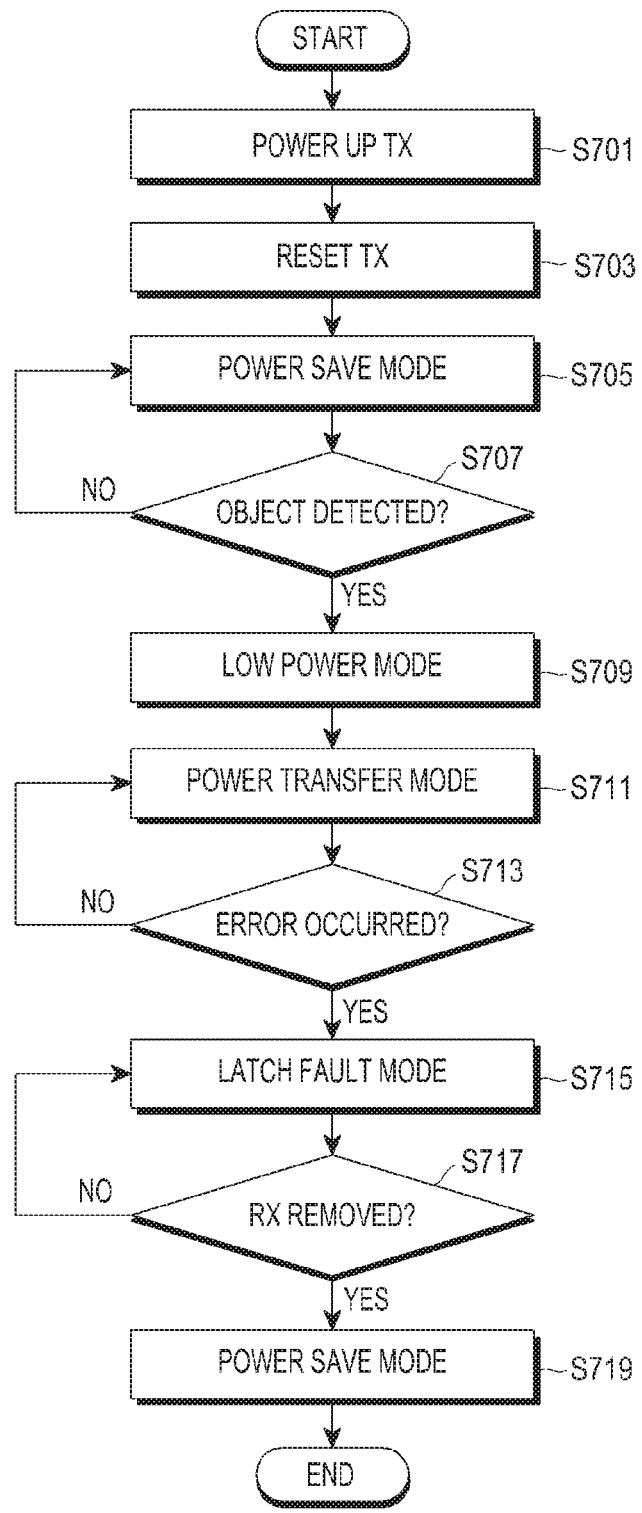
FIG. 7 is a flowchart illustrating a method of controlling a wireless power transmitter, according to an embodiment of the present invention.

FIG. 7 is a flowchart illustrating a method of controlling a wireless power transmitter, according to an embodiment of the present invention.

Referring to FIG. 7, the wireless power transmitter powers up in step S701. In step S703, the wireless power transmitter resets its initial configuration. In step S705, the wireless power transmitter enters a power save mode. In the power save mode, the wireless power transmitter applies different amounts of power to its power transmitter.

Figure 8:
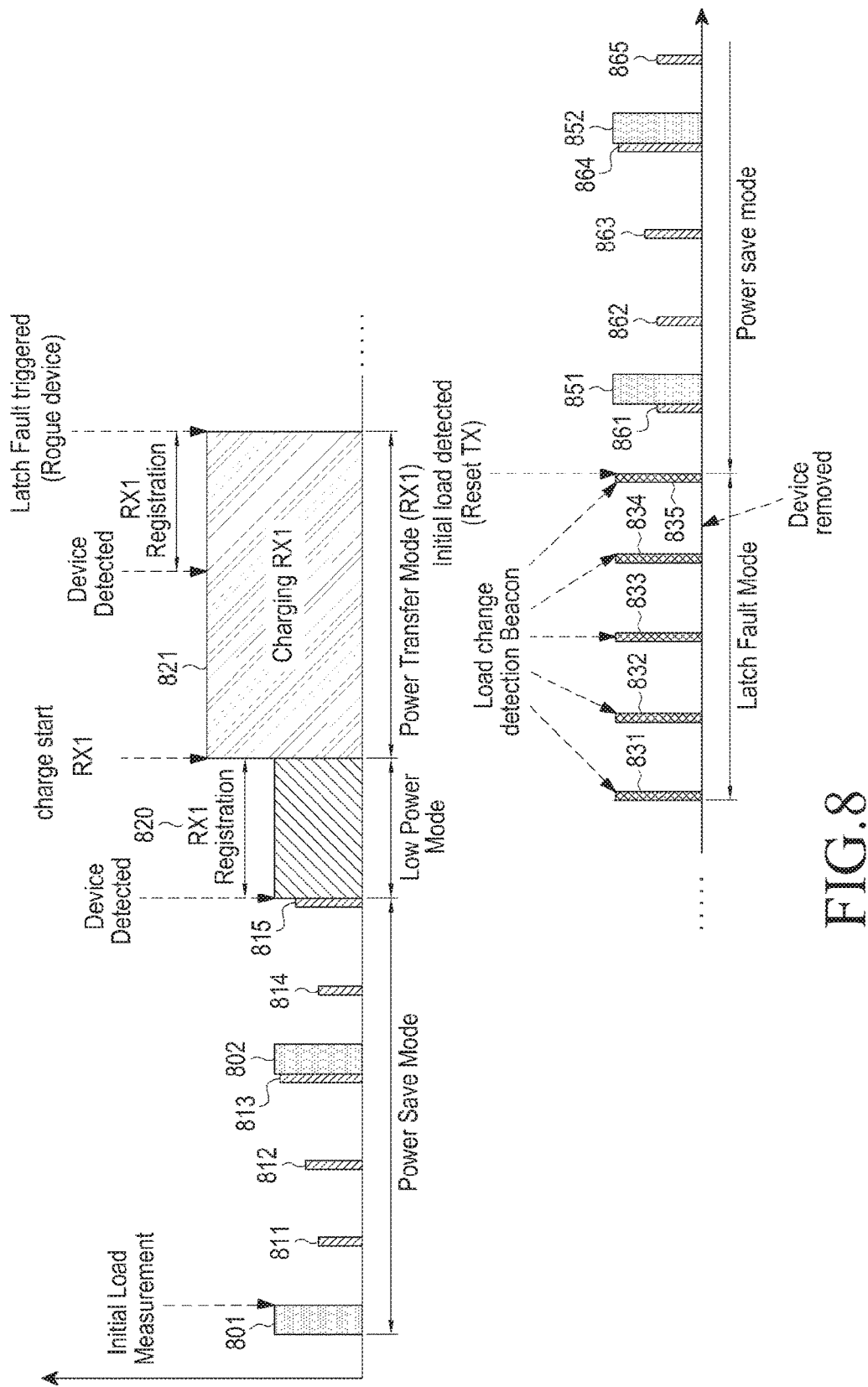
FIG. 8 illustrates histograms of amounts of power applied by a wireless power transmitter, according to an embodiment of the present invention.

FIG. 8 illustrates histograms of amounts of power applied by a wireless power transmitter over time, according to an embodiment of the present invention.

For example, as illustrated in FIG. 8, the wireless power transmitter applies second detection powers 801 and 802 and third detection powers 811 to 815 to the power transmitter. More specifically, the wireless power transmitter applies the second detection powers 801 and 802 at second cycles in a second period of time and applies the third detection powers 811 to 815 at third cycles in a third period of time. Although FIG. 8 illustrates the third detection powers 811 to 815 having different values, the third detection power 811 to 815 may have the same values.

The second detection powers 801 and 802 are set to drive the wireless power receiver, i.e., to drive the controller and communication unit of the wireless power receiver.

The wireless power transmitter applies the second detection powers 801 and 802 and the third detection powers 811 to 815 to the wireless power receiver at second and third cycles, respectively. If the wireless power receiver is arranged on the wireless power transmitter, impedance viewed from a particular point of the wireless power transmitter changes. The wireless power transmitter detects the change in impedance while applying the second detection powers 801 and 802 and the third detection powers 811 to 815. For example, the wireless power transmitter may detect the change in impedance while applying the third detection power 815.

Accordingly, referring again to FIG. 7, the wireless power transmitter detects an object in step S707. If an object has not been detected in step S707, the wireless power transmitter maintains the power save mode in step S705.

When an object is detected, e.g., by a change in impedance, in step S707, the wireless power transmitter enters a low power mode in step S709. In the low power mode, the wireless power transmitter applies enough power to drive the controller and communication unit of the wireless power receiver.

For example, as illustrated in FIG. 8, the wireless power transmitter applies driving power 820 to the power transmitter. The wireless power receiver receives the driving power 820 and drive the controller and communication unit. Based on the driving power 820, the wireless power receiver communicates with the wireless power transmitter in a predetermined scheme. For example, the wireless power receiver transmits or receives data for authentication, and joins a wireless power network hosted by the wireless power transmitter based on the data.

In step S711, the wireless power transmitter enters the power transfer mode to transmit charging power. For example, the wireless power transmitter applies charging power 821, as illustrated in FIG. 8, and the charging power 821 is transmitted to the wireless power receiver.

The wireless power transmitter determines whether an error occurs in the power transmit mode. The error may be a foreign object being placed on the wireless power transmitter, a cross connection, over voltage, over current, over temperature, etc. The wireless power transmitter may include a sensing unit to measure over voltage, over current, over temperature, etc. For example, the wireless power transmitter may measure a voltage or current at a reference point and determine that the measured voltage or current meets the over voltage condition or the over current condition if it exceeds a threshold value. Alternatively, the wireless power transmitter may include a temperature sensing unit to measure a temperature at a reference point of the wireless power transmitter. If the temperature measured at the reference point exceeds a threshold, the wireless power transmitter determines that the over temperature condition is met. Therefore, although FIG. 8 illustrates an error of a foreign object being detected by the wireless power transmitter, the error is not limited thereto, and the wireless power transmitter may operate similarly for different types of errors, e.g., a cross connection, over voltage, over current, over temperature, etc.

If no error occurs in step S713, the wireless power transmitter maintains the power transmit mode in step S711. However, if an error occurs in step S713, the wireless power transmitter enters the latch fault mode in step S715.

For example, as illustrated in FIG. 8, the wireless power transmitter applies first powers 831 to 835. While in the latch fault mode, the wireless power transmitter may output an indication of the error, e.g., a lamp flickering and/or warning sound.

If it is determined that the object causing the error, i.e., the foreign object or a wireless power receiver, has not been removed in step S717, the wireless power transmitter maintains the latch fault mode in step S715.

However, if the object causing the error is removed in step S717, the wireless power transmitter re-enters the power save mode in step S719.

For example, as illustrated in FIG. 8, the wireless power transmitter applies second powers 851 and 852 and third powers 861 to 865.

Figure 9:
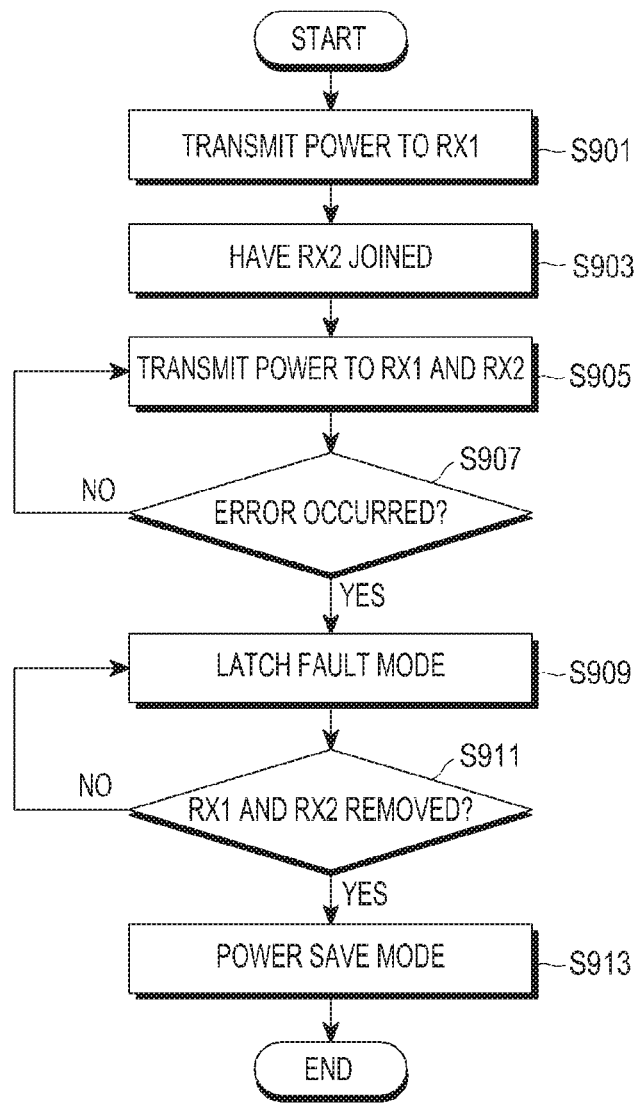
FIG. 9 is a flowchart illustrating a method of controlling a wireless power transmitter, according to an embodiment of the present invention.

FIG. 9 is a flowchart illustrating a method of controlling a wireless power transmitter, according to an embodiment of the present invention.

Referring to FIG. 9, the wireless power transmitter applies charging power to a first wireless power receiver in step S901. In step S903, the wireless power transmitter detects a second wireless power receiver joining in the wireless power network. In step S905, the wireless power transmitter transmits charging power to the second wireless power receiver.

The wireless power transmitter may apply a total of charging power required by the first wireless power receiver and the second wireless power receiver.

Figure 10:
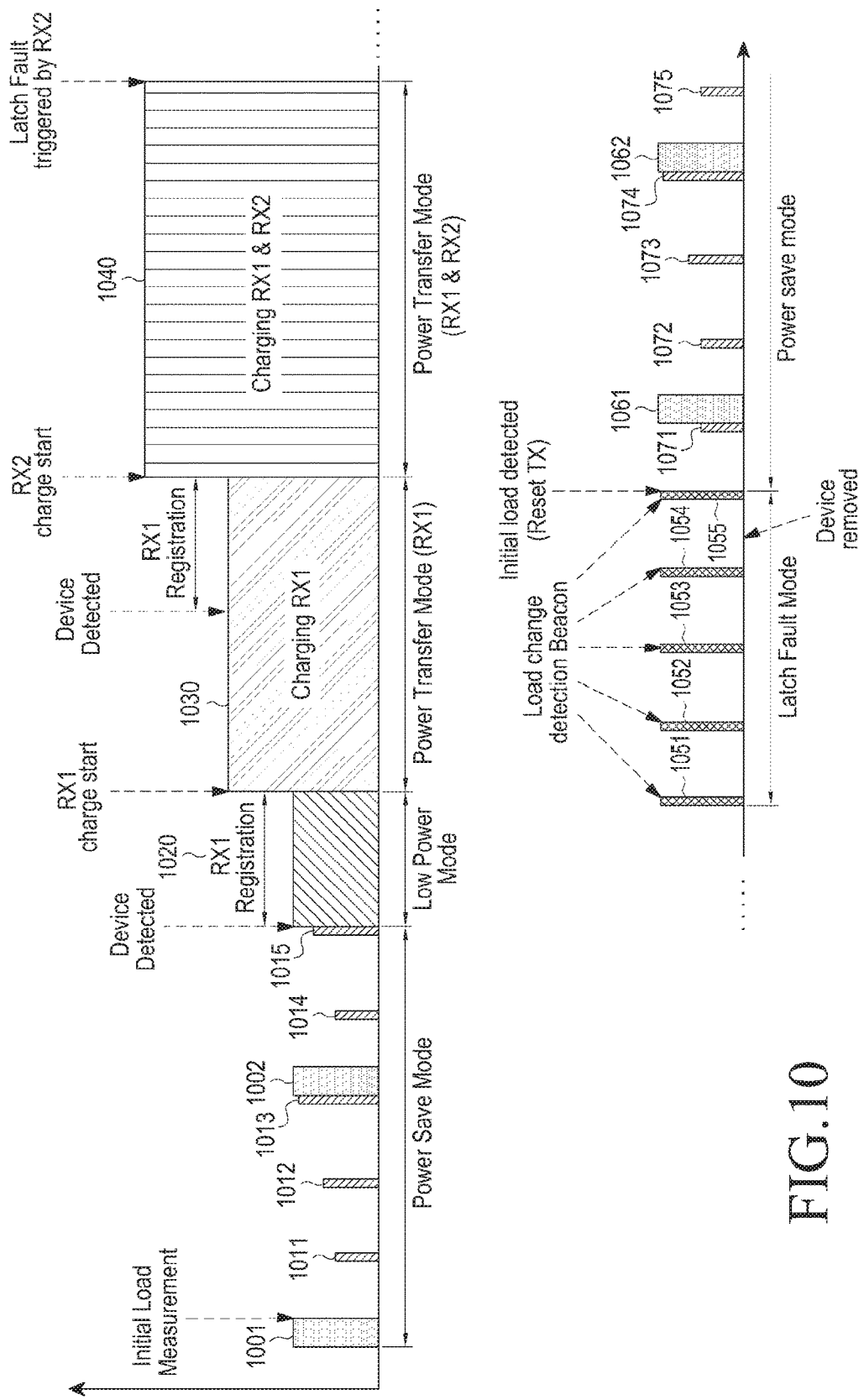
FIG. 10 illustrates histograms of amounts of power applied by a wireless power transmitter, according to an embodiment of the present invention.

FIG. 10 illustrates histograms of amounts of power applied by a wireless power transmitter, according to the embodiment of FIG. 9. Specifically, FIG. 10 illustrates to the power transmissions in steps S901 to S905 of FIG. 9.

For example, referring to FIG. 10, the wireless power transmitter maintains the power save mode in which it applies second detection powers 1001 and 1002 and third detection powers 1011 to 1015. Thereafter, the wireless power transmitter detects the first wireless power receiver and enters the low power mode to hold detection power 1020. Subsequently, the wireless power transmitter enters the power transmit mode to apply first charging power 1030. The wireless power transmitter detects the second wireless power receiver and authorizes the second wireless power receiver join in the wireless power network. The wireless power transmitter applies second charging power 1040, which is equal to a total amount of power required by the first and second wireless power receivers.

Referring again to FIG. 9, the wireless power transmitter detects if an error occurs in step S907, while transmitting charging power to both of the first and second wireless power receivers. As described above, the error may be a foreign object detected by the wireless power transmitter, a cross connection, over voltage, over current, over temperature, etc. If no error occurs in step S907, the wireless power transmitter maintains application of second charging power 1040 in step S905.

If an error occurs in step S907, the wireless power transmitter enters the latch fault mode in step S909. For example, the wireless power transmitter applies first powers 1051 to 1055 at first cycles, as illustrated in FIG. 10.

In step S911, the wireless power transmitter determines whether both the first and second wireless power receivers have been removed.

For example, the wireless power transmitter may detect a change of impedance while applying the first powers 1051 to 1055. Such detection is made based on whether the impedance returns to its initial value.

If both the first and second wireless power receivers are determined to have been removed in step S911, the wireless power transmitter enters the power save mode in step S913.

For example, the wireless power transmitter applies the second detection powers 801 and 802 and the third detection powers 811 to 815 to the wireless power receiver at second and third cycles, respectively.

As described above, even when the wireless power transmitter applies charging power to a plurality of wireless power receivers, it may still determine whether a wireless power receiver or a foreign object is removed when an error has occurred.

Figure 11:
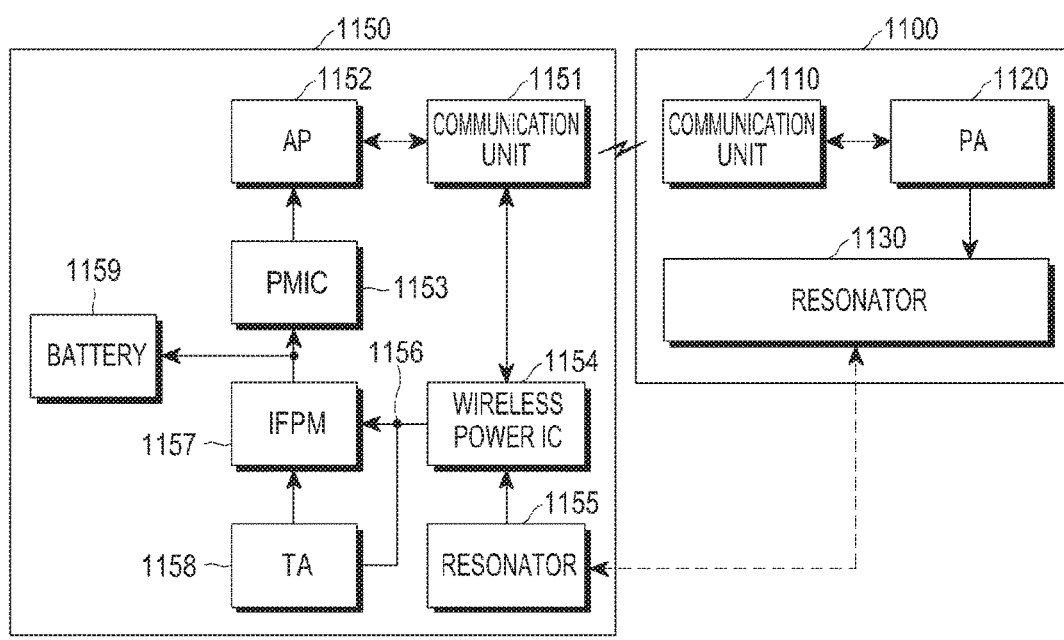
FIG. 11 is a block diagram illustrating a wireless power transmitter and a wireless power receiver, according to an embodiment of the present invention.

FIG. 11 is a block diagram illustrating a wireless power transmitter and a wireless power receiver, according to an embodiment of the present invention.

Referring to FIG. 11, the wireless power transmitter 1100 includes a communication unit 1110, a Power Amplifier (PA) 1120, and a resonator 1130. The wireless power receiver 1150 includes a communication unit 1151, an Application Processor (AP) 1152, a Power Management Integrated Circuit (PMIC) 1153, a wireless power Integrated Circuit (IC) 1154, a resonator 1155, an Interface Power Management IC (IFPM) 1157, a Travel Adapter (TA) 1158, which is a cable charging adapter, and a battery 1159.

The communication unit 1110 communicates with the communication unit 1151, based on a predetermined method, e.g., a BLE method. For example, the communication unit 1151 of the wireless power receiver 1150 transmits a PRU dynamic signal having a data structure as shown in Table 3 to the communication unit 1110 of the wireless power transmitter 1100.

Based on the received PRU dynamic signal, a power value output from the power amplifier 1120 may be adjusted. For example, if an over voltage, an over current, or an over temperature is applied to the wireless power receiver 1150, the power value output from the power amplifier 1120 may be decreased. If a voltage or current of the wireless power receiver 1150 has a value less than a preset value, the power value may be increased.

Charging power from the resonator 1130 is wirelessly transmitted to the resonator 1155.

The wireless power IC 1154 rectifies and DC-to-DC converts the charging power received from the resonator 1155. The wireless power IC 1154 drives the communication unit 1151 or charges the battery 1159 with the DC converted power.

The cable charging adapter 1158 receives a cable charging terminal, such as a 30-pin connector, a Universal Serial Bus (USB) connector, etc., receives power supplied by an external power source through the cable charging terminal, and charges the battery 1159.

The IFPM 1157 receives power applied from the cable charging terminal and outputs the resultant power to the battery 1159 and the PMIC 1153.

The PMIC 1153 manages the power wirelessly received or the power received via cable, and the power applied to respective components of the wireless power receiver 1150. The AP 1152 receives power information from the PMIC 1153 and controls the communication unit 1151 to transmit the PRU dynamic signal to report the reception of the power information.

A node 1156 connected to the wireless power IC 1154 is also connected to the cable charging adapter 1158. If the cable charging connector is inserted into the cable charging adapter 1158, a predetermined voltage, e.g., 5V, is applied to the node 1156. The wireless power IC 1154 determines whether the cable charging connector is inserted into the cable charging adapter by monitoring the voltage applied to the node 1156.

Figure 12:
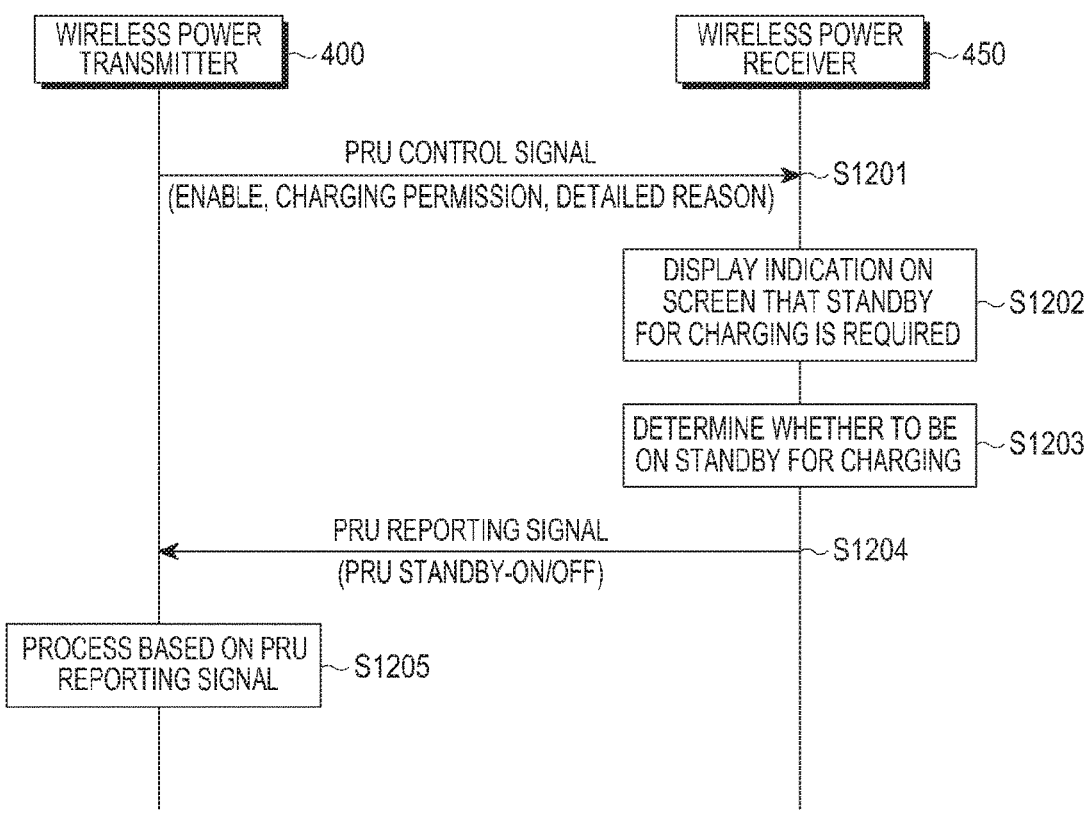
FIG. 12 is a signal flow diagram illustrating a permission procedure between a wireless power transmitter and a wireless power receiver, according to an embodiment of the present invention.

FIG. 12 is a signal flow diagram illustrating a permission procedure for a wireless power receiver, according to an embodiment of the present invention.

Referring to FIG. 12, a wireless power transmitter 400 transmits a PRU control signal or a PRU control message to a wireless power receiver 450 in step S1201. For example, the PRU control signal may include enable information, charging permission information, information about a detailed reason for standby for charging, etc. The PRU control signal is transmitted by the wireless power transmitter 400 to the wireless power receiver 450, after the wireless power transmitter 400 and the wireless power receiver 450 configure a network by exchanging static signals with each other, as illustrated in FIG. 4.

Figure 15:
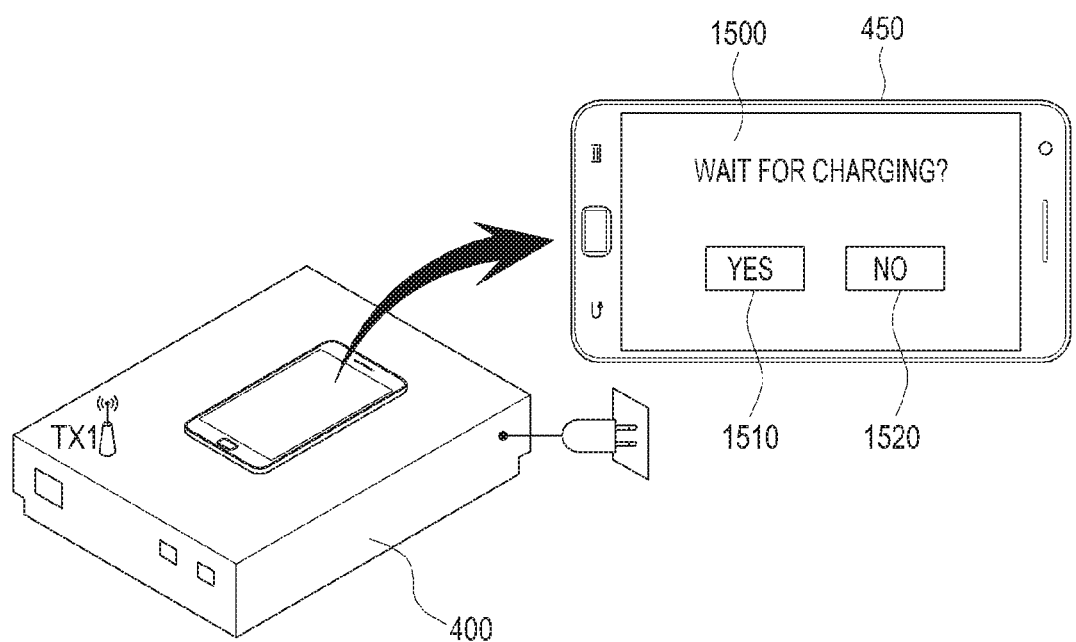
FIG. 15 illustrates a standby screen of a wireless power receiver, according to an embodiment of the present invention.

Upon reception of the PRU control signal, the wireless power receiver 450 identifies the charging permission information included in the PRU control signal. If the PRU control signal includes information to dictate standby for charging in a predetermined data field, the wireless power receiver 450 displays an indication that standby for charging is required in step S1202, e.g., as illustrated in FIG. 15. The wireless power receiver may also present a message allowing the user to select in advance, whether or not to be on standby for charging, e.g., through a receiver charging application.

The user may or may not select standby for charging. In addition, no determination is made whether to be on standby for charging within a predetermined period of time, a default selection may be entered, e.g., it is determined not to be on standby for charging.

As such, a determination about whether to be on standby for charging is made in the wireless power receiver in step S1203, and the wireless power receiver sends the wireless power transmitter 400 information about the determination (standby-on or standby-off) in a PRU reporting signal or a PRU reporting message in step S1204.

In step S1205, the wireless power transmitter 400 receives the PRU reporting signal from the wireless power receiver 450 and proceeds based on the information about the determination (standby-on or standby-off).

For example, if the information about the determination included in the PRU reporting signal is standby-on, the wireless power transmitter performs a process based on the wireless power receiver 450 being on standby for charging. However, if the information about the determination included in the PRU reporting signal is standby-off, the wireless power transmitter terminates a connection with the wireless power receiver.

Figure 13:
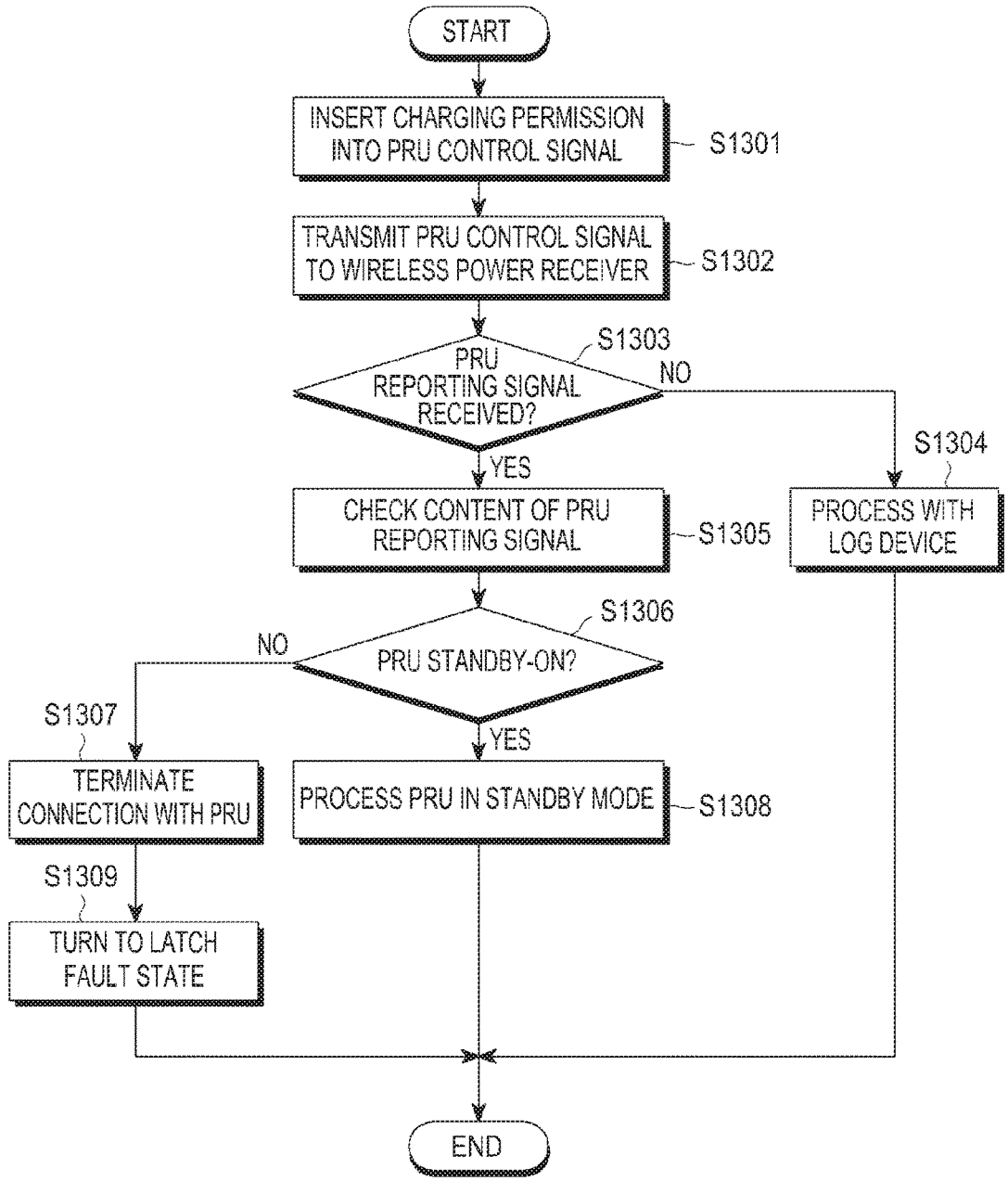
FIG. 13 is a flowchart illustrating an operating process of a wireless power transmitter, according to an embodiment of the present invention.

FIG. 13 is a flowchart illustrating an operating process of a wireless power transmitter, according to an embodiment of the present invention.

Referring to FIG. 13, the wireless power transmitter inserts charging authorization (or permission) information into the PRU control signal in step 1301, and transmits the resultant PRU control signal to a corresponding wireless power receiver in step S1302.

Upon reception of the PRU reporting signal from the wireless power receiver in return for the PRU control signal in step S1303, the wireless power transmitter checks content of the PRU reporting signal in step S1305. If the PRU reporting signal is found to have standby-on in step S1306, the wireless power transmitter performs a process based on the wireless power receiver being on standby for charging in step S1308.

However, if the PRU reporting signal is found to have standby-off in step S1306, the wireless power transmitter terminates connection with the wireless power receiver in step S1307. Optionally, after the disconnection, the wireless power transmitter may enter the latch fault mode in step S1309.

If a PRU reporting signal is not received in step S1303, the wireless power transmitter regards the wireless power receiver as a log device in step S1304.

Figure 14:
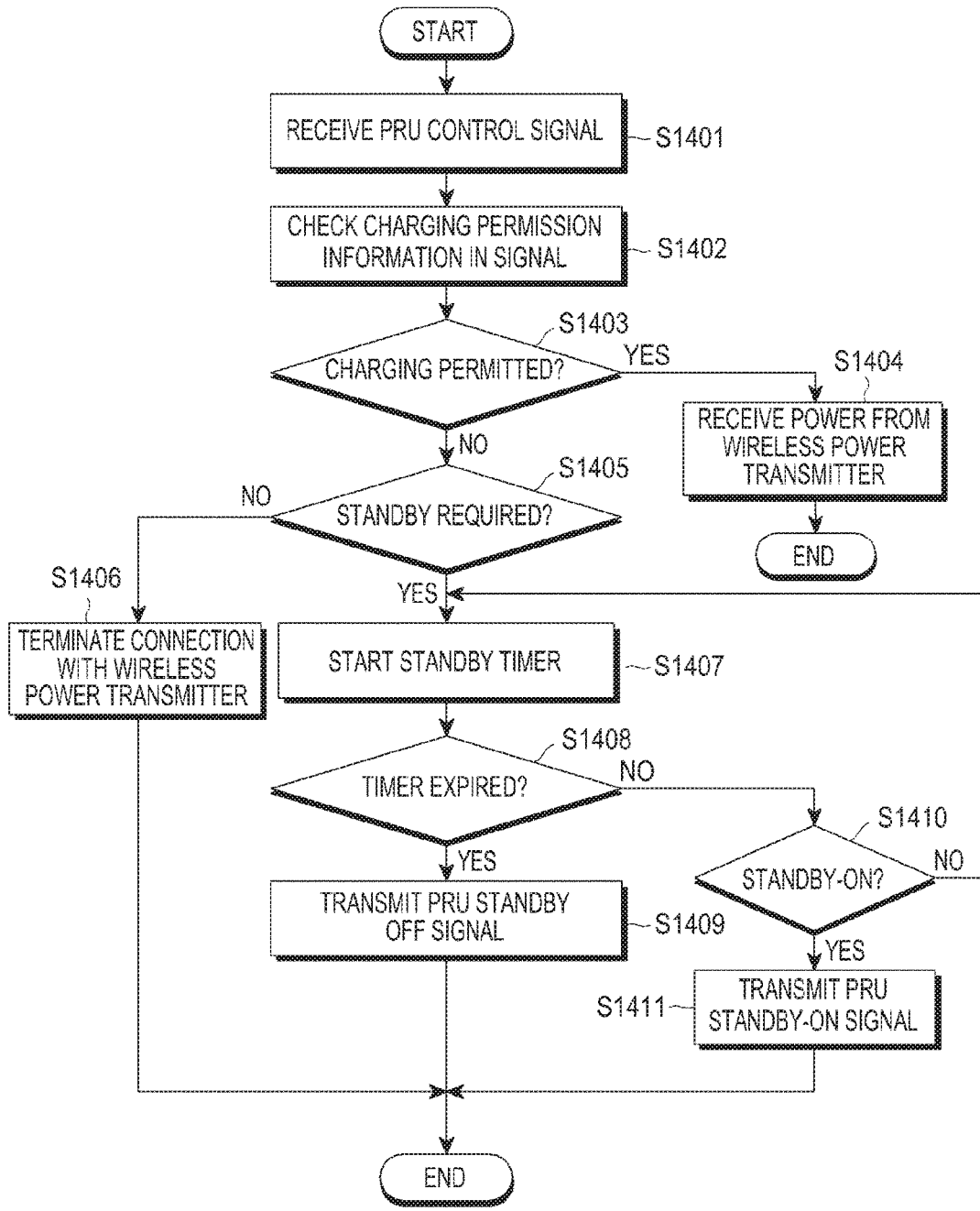
FIG. 14 is a flowchart illustrating an operating process of a wireless power receiver, according to an embodiment of the present invention.

FIG. 14 is a flowchart illustrating an operating process of a wireless power receiver, according to an embodiment of the present invention.

Referring to FIG. 14, upon reception of the PRU control signal from the wireless power transmitter in step S1401, the wireless power receiver checks the charging authorization (or permission) information included in the PRU control signal in step S1402. If the charging authorization information indicates that charging is permitted in step S1403, the wireless power receiver continues to perform the charging process with the wireless power transmitter and receives wireless power from the wireless power transmitter in step S1404.

However, if the charging authorization information indicates that charging is permitted in step S1403 and that standby for charging is required in step S1405, the wireless power receiver starts a standby timer S1407 and waits for a user to indicate whether to be on standby. If the user inputs standby-on before expiration of the standby timer in step S1408, the wireless power receiver sends the standby-on information in the PRU reporting message in step S1411.

However, if the user inputs standby-off or indicated nothing by the expiration of the standby timer, the wireless power receiver sends the standby-off information in the PRU reporting message in steps S1411 and S1409, respectively.

If an indication that charging is not permitted is included in the PRU control signal in step S1403 and standby for charging is not required in step S1405, the wireless power receiver terminates the connection with the wireless power transmitter in step S1406.

FIG. 15 illustrates a standby screen of a wireless power receiver, according to an embodiment of the present invention.

Referring to FIG. 15, if the wireless power transmitter 400 transmits a PRU control message including information about charging authorization to the wireless power receiver 450, the wireless power receiver 450 receives the PRU control message and then displays a message asking the user to select whether or not the wireless power receiver 450 should go on standby for charging.

When the user determines to have the wireless power receiver 450 to be on standby for charging, the user selects "yes" 1510 and waits for charging. However, when the user determines not to have the wireless power receiver 450 be on standby for charging, the user selects "no" 1502 and terminates connection of the wireless power receiver 450 with the wireless power transmitter 400.

Fields of PRU control characteristics may be configured as shown in Table 3 and Table 4 below.

Table 3 shows data fields of the PRU control signal, i.e., PRU control characteristics, and Table 3 shows bit fields for "enable". For example, each characteristic value is set to be 5 octets long.

TABLE 3

| Characteristic | Description | Data Direction | Properties | When used |
|---|---|---|---|---|
| Enables | 1 | PTU turn on, PTU on indication etc. | Mandatory | "0" Disable "1" Enable |
| Permission | 3 | PRU is permitted in PTU | Mandatory | "0" Not Permission "1" Permission |
| RFU | 1 | | | |

TABLE 4

| 7 | 6 | 5 | 4 | 3 | 2 | 1 | 0 |
|---|---|---|---|---|---|---|---|
| Enable PRU output | Enable PRU charge indicator | Reduce power command | | Invalid load | RFU | RFU | RFU |
| 1 = Enable 0 = Disable | 1 = Enable 0 = Disable | 00 = Maximum power 01 = 66% * PRECT_MAX 10 = 33% * PRECT_MAX 11 = 2.5 W | | 1 = Valid 0 = Invalid; remain shut down | RFU | RFU | RFU |

The PRU control message is a signal to be transmitted by the wireless power transmitter to control wireless charging of the wireless power receiver, which is transmitted from the wireless power transmitter to the wireless power receiver, as illustrated in FIG. 4.

In the PRU control signal, "Enable PRU charge indicator" instructs the wireless power receiver to reach maximum power. In this regard, it sets the wireless power receiver at 500 mW before the wireless power receiver reaches the maximum power.

In the PRU control signal, "reduce power" instructs the power of the wireless power receiver to be reduced.

Furthermore, a bit field for permission in Table 3 may be configured as shown in Table 5 below.

TABLE 5

| Value (Bit) | Description | |
|---|---|---|
| 0 | Permitted without reason | 1 = Permission, 0 = Not Permission |
| 1 | Denied with system error 3 described in Section 5.2.8.7. (Cross-Connection case) | 1 = Permission, 0 = Not Permission |
| 2 | Denied due to limited affordable power | 1 = Permission, 0 = Not Permission |
| 3 | Permitted with waiting time due to limited affordable power | 1 = Permission, 0 = Not Permission |
| 4 | Denied due to limited PTU Max Source Impedance | 1 = Permission, 0 = Not Permission |
| 5 | Denied due to limited PTU Max Load Resistance | 1 = Permission, 0 = Not Permission |
| 6 | Denied due to limited PTU Number of Devices | 1 = Permission, 0 = Not Permission |
| 7 | Denied due to limited PTU Class support | 1 = Permission, 0 = Not Permission |
| 8 | Denied due to limited PTU resonator design | 1 = Permission, 0 = Not Permission |

TABLE 5-continued

| Value (Bit) | Description | |
|---|---|---|
| 9 | Denied due to limited H/W revision | 1 = Permission, 0 = Not Permission |
| 10 | Denied due to limited Firmware revision | 1 = Permission, 0 = Not Permission |
| 11 | Denied due to limited Protocol revision | 1 = Permission, 0 = Not Permission |
| 12 | Denied due to non-certified device | 1 = Permission, 0 = Not Permission |
| 13 | Denied due to not supporting PRU Vrect min | 1 = Permission, 0 = Not Permission |
| 14 | Denied due to not supporting PRU Vrect max | 1 = Permission, 0 = Not Permission |
| 15 | Denied due to not supporting PRU Vrect Target | 1 = Permission, 0 = Not Permission |
| 16 | Denied due to not supporting Authentication | 1 = Permission, 0 = Not Permission |
| 17 | Denied due to hard interference | 1 = Permission, 0 = Not Permission |
| 18-23 | RFU | RFU |

Table 6 and Table 7 show reactions of the wireless power receiver to the values, as shown in Table 5, which are included in the PRU control signal that the wireless power receiver receives. That is, the wireless power receiver displays a User Interface (UI) from the user perspective or performs operations with reference to received detailed permission information as shown in Table 6 and Table 7 below.

Table 6 and Table 7 show PTU/PRU operations.

TABLE 6

| Value (Bit) | Description | UI If PRU Receive Next Message |
|---|---|---|
| 0 | Permitted without reason | 1. Pop up Registration Confirm Message through Receiving Phone UI 2. Show Confirmation through Phone Lamp (Red/Blue) 3. Indicate Confirmation through Phone Alarm |
| 1 | Denied with system error 3 described in Section 5.2.8.7. | 1. Pop up Registration Confirm Message through UI for e.g., Phone 2. Display Indication that Connection with other PTU Device is made (Cross-Connection case) |
| 2 | Denied due to limited affordable power | 1. Display in Phone that there is No Sufficient Power from Tx PAD and Notify of Removal |
| 3 | Permitted with waiting time due to limited affordable power | 1. Pop up Message in Phone to be on Standby for Charging |
| 4 | Denied due to limited PTU Max Source Impedance | 1. Display in Phone that Charging Efficiency may be limited |
| 5 | Denied due to limited PTU Max Load Resistance | 1. Display in Phone that Charging Efficiency may be limited |
| 6 | Denied due to limited PTU Number of Devices | 1. Notify in Message that PTU cannot Charge Exceeding Number of Devices |
| 7 | Denied due to limited PTU Class support | 1. Display that PTU cannot Charge PRU 2. Display that PRU Category is not Supported |
| 8 | Denied due to limited PTU resonator design | 1. Display that PTU cannot Charge PRU |

TABLE 7

| Value (Bit) | Description | UI If PRU Receive Next Message |
|---|---|---|
| 9 | Denied due to limited H/W revision | 1. Pop up in Message that Some Functions are Limited due to Low H/W version of PRU 2. Display in Phone an indication that Charging Efficiency may be Limited |
| 10 | Denied due to limited Firmware revision | 1. Pop up in Message that Some Functions are Limited due to Low Firmware version of PRU |
| 11 | Denied due to limited Protocol revision | 1. Pop up in Message that Some Functions are Limited due to Low Protocol version of PRU |
| 12 | Denied due to non-certified device | 1. Turn on Light in Tx PAD Indicating non-Authentication Device (e.g., red light flickering or alarming 5 times in a row) 2. Pop up Message of Wrong Cross Connection for User to Re-arrange the Device |
| 13 | Denied due to not supporting PRU Vrect min | — |
| 14 | Denied due to not supporting PRU Vrect max | — |
| 15 | Denied due to not supporting PRU Vrect Target | — |
| 16 | Denied due to not supporting Authentication | — |
| 17 | Denied due to hard interference | — |
| 18-23 | RFU | — |

In the following, charging standby operation mechanism (frame modification/reflection) will be described with reference to Tables 8 to 10.

Table 8 illustrates information included in the PRU reporting message transmitted from the wireless power receiver to the wireless power transmitter.

TABLE 8

| Value (Bit) | Description | PRU's Message |
|---|---|---|
| 3 | Permitted with waiting time due to limited affordable power | Send PTU Message that PRU is to be on Standby on Tx PAD Respond that it is on Standby and Request to hold Connection (Use PRU Control Characteristic) |

| 7 | 6 | 5 | 4 | 3 | 2 | 1 | 0 |
|---|---|---|---|---|---|---|---|
| Enable PRU output | Enable PRU charge indicator | Reduce power command | Invalid load | PRU Wait | | RFU | RFU |
| 1 = Enable 0 = Disable | 1 = Enable 0 = Disable | 00 = Maximum power 01 = 66% * PRECT_MAX 10 = 33% * PRECT_MAX 11 = 2.5 W | 1 = Valid 0 = Invalid; remain shut down | 1 = On 2 = Off | | RFU | RFU |

The wireless power receiver keeps connection with the wireless power transmitter by sending, to the wireless power transmitter, an indication that the wireless power transmitter is to wait for wireless charging in the PRU reporting message. When the wireless power receiver will "wait" for wireless charging, the wireless power transmitter recognizes a load change on its charging pad.

Figure 16:
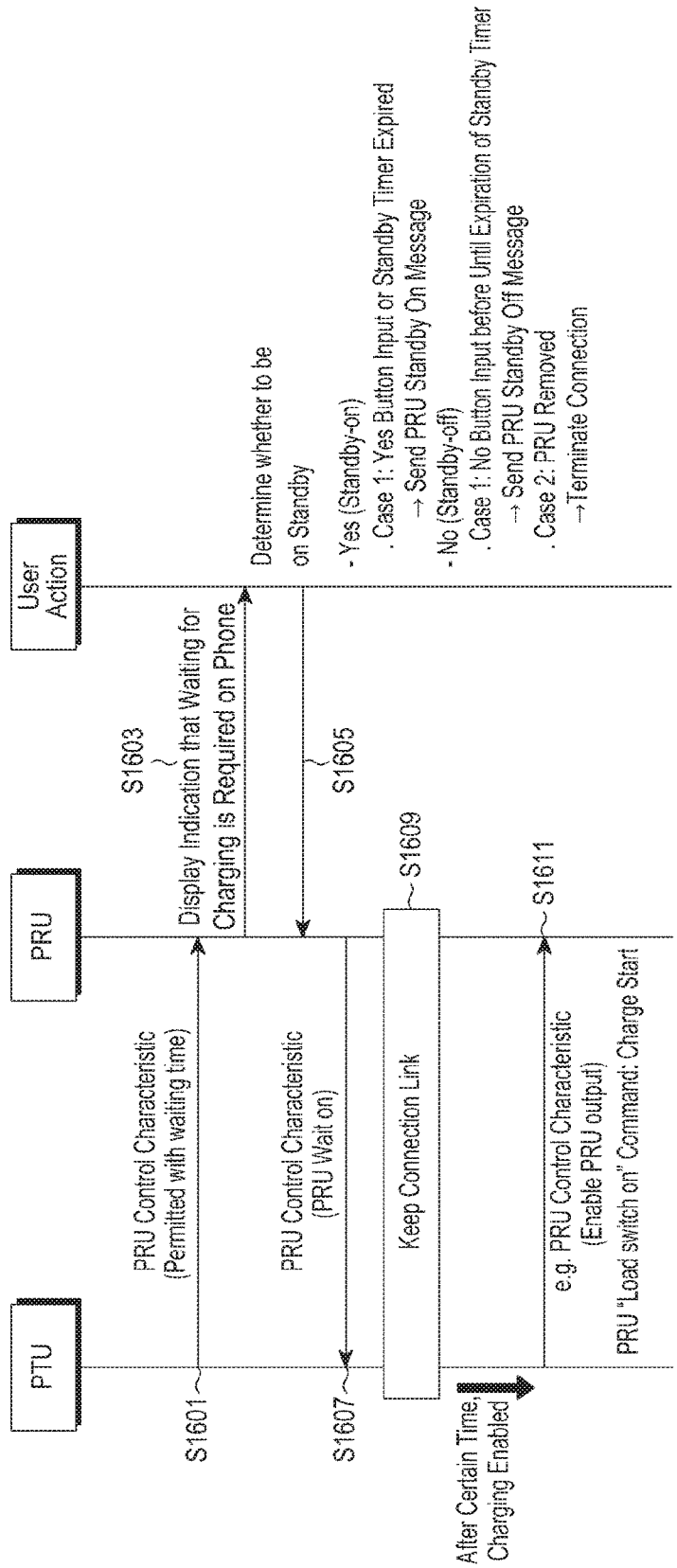
FIG. 16 is a signal flow diagram illustrating a permission procedure between a wireless power transmitter and a wireless power receiver, according to an embodiment of the present invention.

FIG. 16 is a signal flow diagram illustrating a permission procedure between a wireless power transmitter and a wireless power receiver, according to an embodiment of the present invention.

Referring to FIG. 16, the wireless power transmitter (PTU) sends the wireless power receiver (PRU) information that standby for charging is required in the PRU control signal in step S1601, and then the wireless power receiver displays a message that standby for charging is required in step S1603, e.g., as illustrated in FIG. 15.

In step S1605, the user determines whether to have the wireless power receiver to be on standby for charging. In step S1607, the wireless power receiver sends the determination result (e.g., standby-on or standby-off) to the wireless power transmitter in the PRU reporting signal.

In FIG. 16, the wireless power receiver sends standby-on in the PRU control signal in step S1607, and the connection between the wireless power transmitter and the wireless power receiver is maintained in step S1609.

Thus, after a lapse of a certain period of time, when the wireless power transmitter is able to charge the wireless power receiver, in step S1611, the wireless power transmitter sends, to the wireless power receiver, information indicating that charging is enabled in the PRU control signal. Upon reception of the PRU control signal, the wireless power receiver starts charging by turning a PRU load switch on.

Table 9 shows examples of several system error conditions.

TABLE 9

| System Error | Fault description |
|---|---|
| 1 | PRU over-voltage region |
| 2 | PTU co-location |
| 3 | PTU determines it has established a communication link with a PRU that is not in the PTU charge area |
| 4 | |

If a system error occurs in the wireless power receiver, the wireless power transmitter may hold information of the wireless power receiver in system registration for greater than three seconds.

Table 10 shows an example of information of the wireless power transmitter.

TABLE 10

| Origin State | Destination State | Required or Optional | Additional Required conditions | Exceptions |
|---|---|---|---|---|
| PTU Power Save Mode PTU Low Power Mode PTU Power Transfer Mode | PTU Configuration | Required | None | At least one PTU Local Fault |

According to the above-described embodiments of the present invention, a method and apparatus are provided for charging a wireless power receiver in a wireless power transmitter of a wireless charging network.

With the method and apparatus, the wireless power transmitter sends charging authorization information indicating whether the wireless power receiver is authorized for charging, via a PRU control signal, thereby efficiently controlling the charging of the wireless power receiver.

Further, the wireless power transmitter efficiently manages networking with various wireless power receivers within its range by receiving a reporting signal from the wireless power receivers.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for permitting a wireless power receiver to be charged by a wireless power transmitter, the method comprising:
    transmitting a first power for initiating a communication unit of the wireless power receiver;
    establishing a communication connection with the wireless power receiver while transmitting the first power;
    receiving information corresponding to required power from the wireless power receiver;
    determining whether the wireless power transmitter has an available power to the wireless power receiver, based at least in part on the received information;
    if the wireless power transmitter does not have the available power, generating a first control signal including permission information indicating that charging the wireless power receiver is permitted with a waiting time and transmitting the first control signal to the wireless power receiver; and
    if the wireless power transmitter has the available power, generating a second control signal including permission information indicating that the wireless power receiver is permitted to begin charging and transmitting the second control signal to the wireless power receiver.

2. The method of claim 1, further comprising receiving from the wireless power receiver a reporting signal including standby information indicating whether the wireless power receiver is on standby for charging.

3. The method of claim 2, further comprising preparing for charging the wireless power receiver, if the standby information indicates that the wireless power receiver is on standby for charging.

4. The method of claim 1, wherein transmitting the first control signal includes maintaining a connection with the wireless power receiver if the wireless power transmitter remains in a power transfer state of the wireless power transmitter.

5. The method of claim 2, further comprising terminating a connection with the wireless power receiver, when the standby information indicates that the wireless power receiver is not on standby for charging.

6. The method of claim 2, further comprising entering into a latch fault state, when the standby information indicates that the wireless power receiver is not on standby for the charging.

7. A control method of a wireless power receiver, the method comprising:
    receiving, through a power receiving circuit, a first power for initiating a communication unit from a wireless power transmitter;
    establishing a communication connection with the wireless power transmitter while receiving the first power;
    transmitting information corresponding to required power to the wireless power transmitter;
    receiving, from a wireless power transmitter, a first control signal including permission information indicating that charging the wireless power receiver is permitted with a waiting time if the wireless power transmitter does not have an available power;
    determining whether the wireless power receiver is on standby;
    generating a reporting signal including standby information indicating whether or not the wireless power receiver is determined to be on standby for charging;
    transmitting the reporting signal to the wireless power transmitter; and
    receiving a second control signal including permission information indicating that the wireless power receiver is permitted to begin charging if wireless power transmitter has the available power.

8. The method of claim 7, wherein determining whether the wireless power receiver is on standby comprises:
    querying a user of the wireless power receiver whether or not to be on standby;
    receiving an indication from the user in response to the querying; and
    setting the standby information as standby-on information, if the indication from the user indicates to be on standby for charging.

9. The method of claim 8, wherein determining whether to be on standby further comprises setting the standby information as standby-off information, if the indication from the user indicates not to be on standby for charging.

10. The method of claim 7, wherein determining whether the wireless power receiver is on standby comprises:
    querying a user of the wireless power receiver;
    failing to receive an indication from the user in response to the querying, within a predetermined period of time; and
    setting the standby information as standby-off information, based on the failing to receive the indication.

11. A wireless power transmitter for wirelessly charging a wireless power receiver, the wireless power transmitter comprising:
    a power transmitter configured to wirelessly transmit charging power to the wireless power receiver;
    a communication unit configured to establish a communication connection with the wireless power receiver while transmitting a first power; and
    a controller configured to:
        in response to receiving information corresponding to required power from the wireless power receiver, determine whether the wireless power transmitter has an available power to the wireless power receiver, based at least in part on the received information;
        generate a first control signal including permission information indicating that charging the wireless power receiver is permitted with a waiting time if the wireless power transmitter does not have the available power,
        control the communication unit to transmit the first control signal to the wireless power receiver,
        generate a second control signal including permission information indicating that the wireless power receiver is permitted to begin charging, if the wireless power transmitter has the available power, and
        control the communication unit to transmit the second control signal to the wireless power receiver.

12. The wireless power transmitter of claim 11, wherein the communication unit is configured to receive a reporting signal including standby information from the wireless power receiver indicating whether or not the wireless power receiver is on standby for charging; and wherein the controller is configured to identify whether the wireless power receiver is on standby for charging from the reporting signal.

13. The wireless power transmitter of claim 12, wherein the controller prepares for charging the wireless power receiver if the standby information indicates that the wireless power receiver is on standby for charging.

14. The wireless power transmitter of claim 12, wherein the controller maintains the connection with the wireless power receiver if the wireless power receiver is identified as being on standby for charging.

15. The wireless power transmitter of claim 11, wherein the controller maintains a connection with the wireless power receiver if the wireless power transmitter remains in a power transfer state.

16. The wireless power transmitter of claim 12, wherein the controller terminates the connection with the wireless power receiver if it is found that the wireless power receiver is not on standby for charging.

17. The wireless power transmitter of claim 12, wherein the controller controls entry into a latch fault state if it is found that the wireless power receiver is not to be on standby for charging.

18. A wireless power receiver for receiving charging power from a wireless power transmitter, the wireless power receiver comprising:

a power receiver configured to receive charging power from the wireless power transmitter;

a communication unit configured to establish a communication connection with the wireless power transmitter while receiving a first power, receive, from the wireless power transmitter, a first control signal including permission information indicating that charging the wireless power receiver is permitted with a waiting time when the wireless power transmitter does not have an available power;

a display unit configured to display a message asking a user whether to be on standby; and a controller configured to generate a reporting signal including standby information indicating whether the wireless power receiver is on standby for charging and to control the communication unit to transmit the reporting signal to the wireless power transmitter, wherein the communication unit receives a second control signal including permission information indicating that the wireless power receiver is permitted to begin charging if the wireless power transmitter has the available power.

19. The wireless power receiver of claim 18, wherein the controller indicates standby-on information in the reporting signal if standby for charging is selected by an input means from the displayed message.

20. The wireless power receiver of claim 18, wherein the controller indicates standby-off information in the reporting signal if standby for charging is not selected by an input means from the displayed message.

21. The wireless power receiver of claim 18, wherein the controller indicates standby-off information in the reporting signal if standby for charging is not selected within a predetermined period of time from the displayed message.

* * * * *